United States Patent
Jung et al.

(10) Patent No.: US 12,001,617 B1
(45) Date of Patent: Jun. 4, 2024

(54) ELECTRONIC DEVICE AND METHOD OF OPERATING ELECTRONIC PEN

(71) Applicant: Samsung Electronics Co., Ltd., Suwon-si (KR)

(72) Inventors: Inhyung Jung, Suwon-si (KR); Byunghoon Kang, Suwon-si (KR); Hyunwoong Kwon, Suwon-si (KR); Sanghui Park, Suwon-si (KR); Banghyun Kwon, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/966,429

(22) Filed: Oct. 14, 2022

Related U.S. Application Data

(63) Continuation of application No. PCT/KR2022/011842, filed on Aug. 9, 2022.

(30) Foreign Application Priority Data

Aug. 10, 2021 (KR) .................. 10-2021-0105004

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01); *G06F 2203/0384* (2013.01)

(58) Field of Classification Search
CPC .................................................. G06F 3/03545
See application file for complete search history.

(56) References Cited

U.S. PATENT DOCUMENTS

| | | |
|---|---|---|
| 9,626,010 B2 | 4/2017 | Yoon |
| 9,904,379 B2 | 2/2018 | Marshall et al. |

(Continued)

FOREIGN PATENT DOCUMENTS

| | | |
|---|---|---|
| JP | H06-161637 A | 6/1994 |
| JP | 2013-242821 A | 12/2013 |

(Continued)

OTHER PUBLICATIONS

International Search Report dated Nov. 8, 2022, issued in International Patent Application No. PCT/KR2022/011842.

*Primary Examiner* — Chun-Nan Lin
(74) *Attorney, Agent, or Firm* — Jefferson IP Law, LLP

(57) ABSTRACT

An electronic device is provided. The electronic device includes a display, a communication circuit, a memory, and a processor operatively connected to the display, the communication circuit, and the memory, wherein the processor is configured to detect a pen event for the display to obtain a frequency, to establish a communication connection with an electronic pen using the communication circuit to obtain switch information and a device identification (ID), to obtain an electronic pen connection record from the memory, to determine a type of the electronic pen based on the device ID, to determine an operation mode of the electronic pen based on the switch information when the switch information is obtained, and to perform a predetermined function based on at least one of the frequency, the electronic pen connection record, the type of the electronic pen, or the operation mode.

20 Claims, 17 Drawing Sheets

(56) References Cited

U.S. PATENT DOCUMENTS

| | | |
|---|---|---|
| 10,564,736 B2 | 2/2020 | Lee et al. |
| 10,572,144 B2 | 2/2020 | Choi et al. |
| 2012/0274583 A1* | 11/2012 | Haggerty .............. G06F 3/0488 345/173 |
| 2018/0173330 A1* | 6/2018 | Lee ..................... G06F 3/04162 |
| 2018/0181220 A1* | 6/2018 | Hung .................... G06F 3/0304 |
| 2019/0179436 A1* | 6/2019 | Kake .................. G06K 7/10376 |
| 2021/0294452 A1 | 9/2021 | Oh et al. |

FOREIGN PATENT DOCUMENTS

| | | |
|---|---|---|
| JP | 2016-029531 A | 3/2016 |
| KR | 10-1221895 B1 | 1/2013 |
| KR | 10-2015-0025696 A | 3/2015 |
| KR | 10-2016-0120969 A | 10/2016 |
| KR | 10-2018-0013401 A | 2/2018 |

* cited by examiner

FIG. 9A
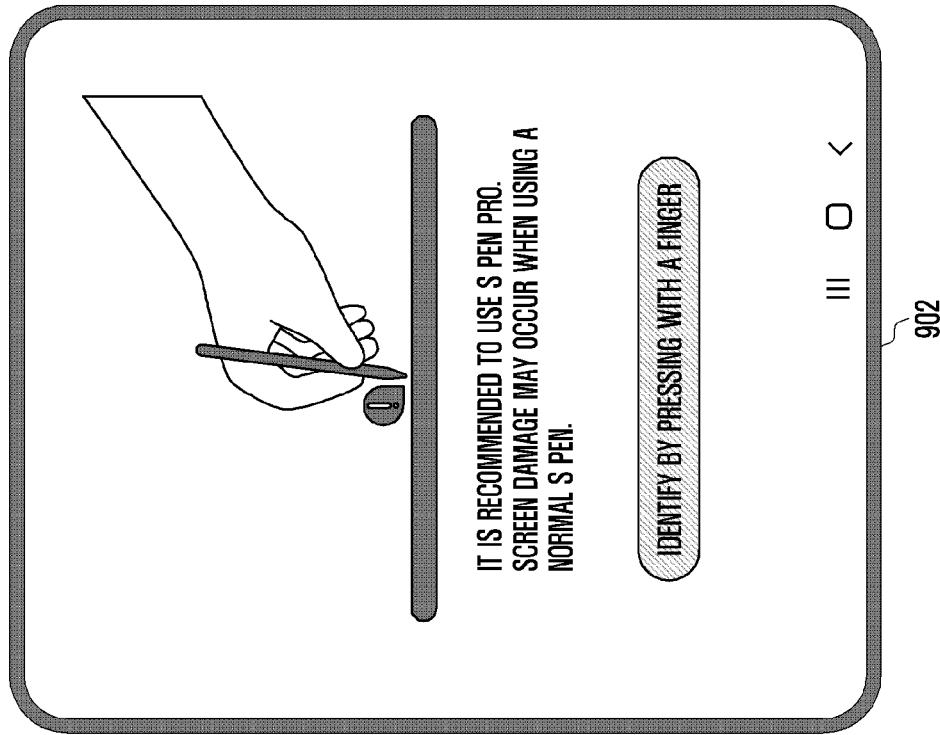
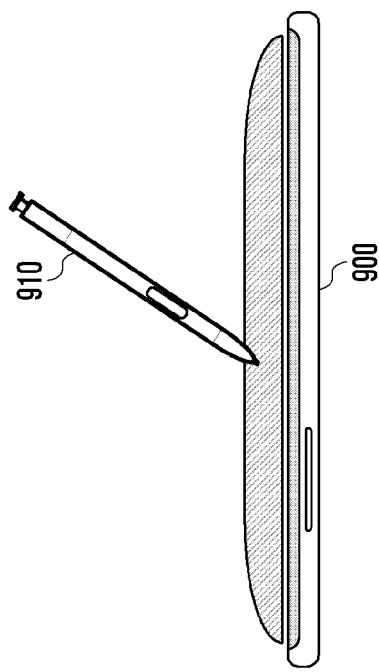

FIG. 9B
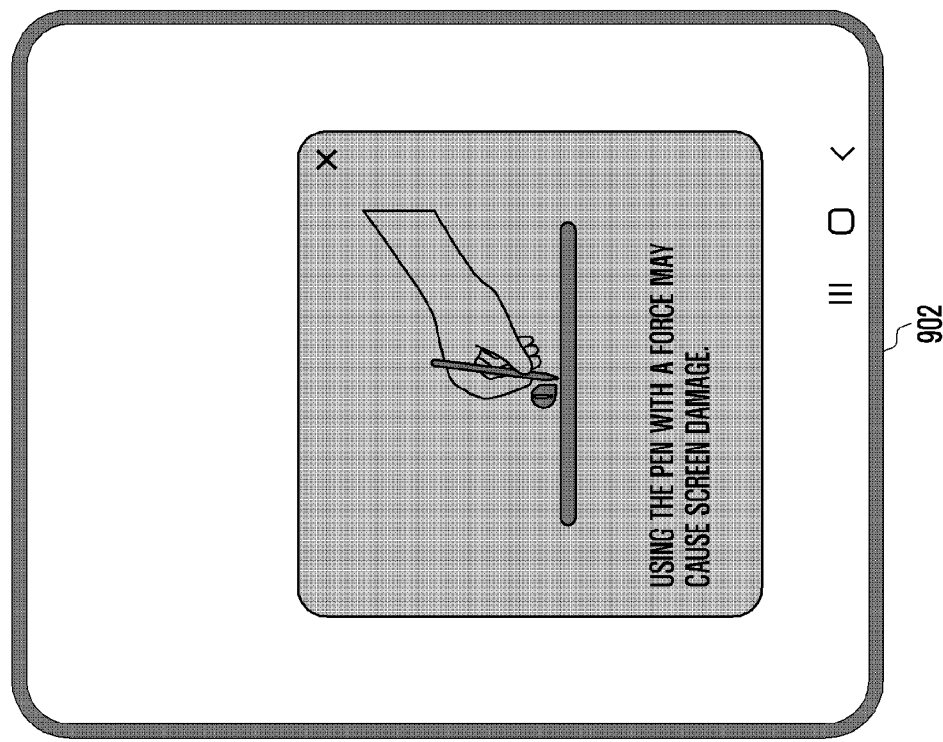
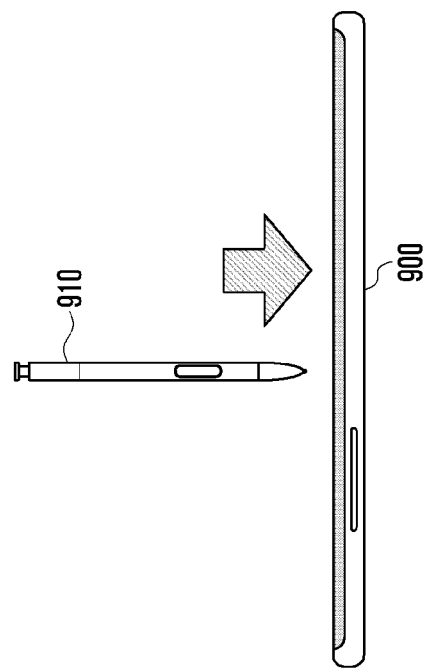

ELECTRONIC DEVICE AND METHOD OF OPERATING ELECTRONIC PEN

CROSS-REFERENCE TO RELATED APPLICATION(S)

This application is a continuation application, claiming priority under § 365(c), of an International application No. PCT/KR2022/011842, filed on Aug. 9, 2022, which is based on and claims the benefit of a Korean patent application number 10-2021-0105004, filed on Aug. 10, 2021, in the Korean Intellectual Property Office, the disclosure of which is incorporated by reference herein in its entirety.

TECHNICAL FIELD

The disclosure relates to an electronic device. More particularly, the disclosure relates to a method of operating an electronic pen in an electronic device.

BACKGROUND ART

With the development of mobile communication technology and hardware/software technology, a portable electronic device (hereinafter, an electronic device) may implement various functions in addition to a call function. The electronic device may connect wireless communication with an external device using a communication circuit and receive various inputs from a user through a specified input device connected through wireless communication.

The electronic device may identify an input location of the input device and perform a function corresponding thereto. The electronic device may detect a magnetic field generated in an input device including an electromagnetic (EM) type resonance circuit using an electromagnetic resonance (EMR) method. The electronic device may identify a location of the input device based on an induced electromotive force generated by a magnetic field for each channel.

The electronic device may perform a predetermined function based on a signal received from the input device. For example, the electronic device may determine an operation to be performed according to a reception frequency and perform a mapped operation when a specific frequency is received from the input device.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device according to an embodiment may include ultrathin glass (UTG) to be bendable in a glass layer of a flexible display. UTG has superior visibility and hardness compared to a transparent polyimide (PI) film, but may be easily broken or cracked by an external impact. When a lot of touch inputs are performed on the flexible display with a pen tip of the input device, there is a risk of damage to the display of the electronic device.

Aspects of the disclosure are to address at least the above-mentioned problems and/or disadvantages and to provide at least the advantages described below. Accordingly, an aspect of the disclosure is to provide a method of guiding a user to use an appropriate input device by detecting a type of an input device in an electronic device.

Additional aspects will be set forth in part in the description which follows and, in part, will be apparent from the description, or may be learned by practice of the presented embodiment.

Technical Solution

In accordance with an aspect of the disclosure, an electronic device is provided. The electronic device includes a display, a communication circuit, a memory, and a processor operatively connected to the display, the communication circuit, and the memory, wherein the processor is configured to detect a pen event for the display to obtain a frequency, to establish a communication connection with an electronic pen using the communication circuit to obtain switch information and a device identification (ID), to obtain an electronic pen connection record from the memory, to determine a type of the electronic pen based on the device ID, to determine an operation mode of the electronic pen based on the switch information when the switch information is obtained, and to perform a predetermined function based on at least one of the frequency, the electronic pen connection record, the type of the electronic pen, or the operation mode.

In accordance with another aspect of the disclosure, a method of operating an electronic pen of an electronic device is provided. The method includes detecting a pen event for a display to obtain a frequency, establishing a communication connection with the electronic pen using a communication circuit to obtain switch information and a device identification (ID), obtaining an electronic pen connection record from a memory, determining a type of the electronic pen based on the device ID, determining an operation mode of the electronic pen based on the switch information when the switch information is obtained, and performing a predetermined function based on at least one of the frequency, the electronic pen connection record, the type of the electronic pen, or the operation mode.

Advantageous Effects

According to various embodiments, an electronic device can prevent the use of an input device that may damage a display. The electronic device can determine a type of the input device using a device ID of the input device received by establishing a communication connection, and display an appropriate warning message on the display to guide to use a display dedicate pen. Thereby, the electronic device can reduce the risk of damage to the display.

According to various embodiments, the electronic device can prevent a situation in which a malfunction occurs when the electronic device is used in a state in which a frequency is configured wrongly. Because an operation mapped to the received frequency is different from that of the existing electronic device, the electronic device can perform no function in a state in which the frequency is configured wrongly.

Further, effects obtainable or predicted by various embodiments of the electronic device will be directly or implicitly disclosed in the detailed description of the embodiments of the electronic device. For example, various effects predicted according to various embodiments of the electronic device will be disclosed in the detailed description to be described later.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 9A and 9B are diagrams illustrating a display of a graphic UI including a warning message according to a pen pressure of an input device in an electronic device according to various embodiments of the disclosure;

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit the disclosure. In addition, descriptions of well-known functions and constructions may will be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings, and the size of each component does not fully reflect the actual size. Accordingly, the disclosure is not limited by a relative size or spacing drawn in the accompanying drawings.

Figure 1:
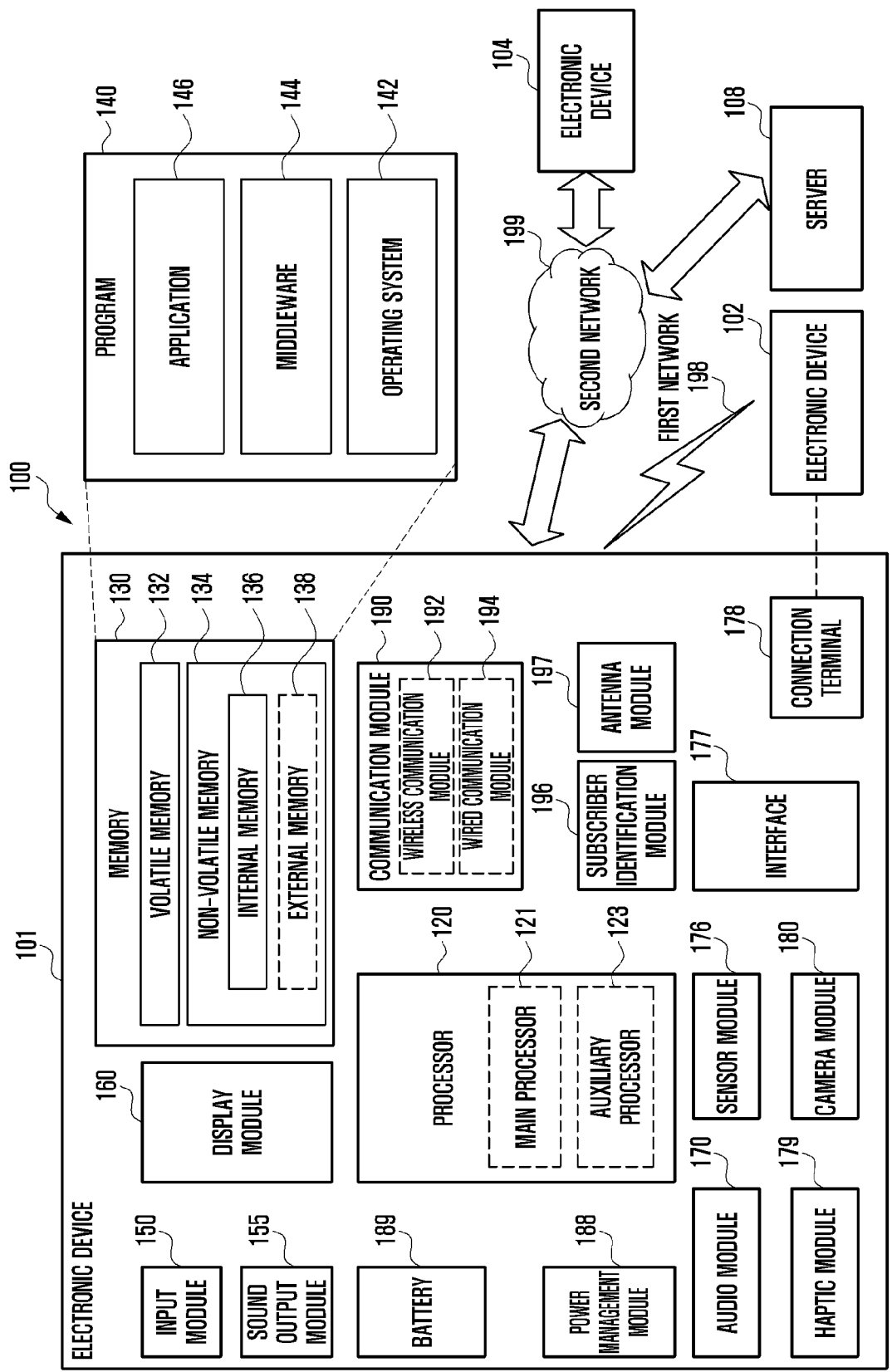
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication circuit 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication circuit 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication circuit 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication circuit 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication circuit 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication circuit 190 may include one or more communication processors that are operable independently from the processor 120 (e.g., the application processor (AP)) and supports a direct (e.g., wired) communication or a wireless communication. According to an embodiment, the communication circuit 190 may include a wireless communication circuit 192 (e.g., a cellular communication circuit, a short-range wireless communication circuit, or a global navigation satellite system (GNSS) communication circuit) or a wired communication circuit 194 (e.g., a local area network (LAN) communication circuit or a power line communication (PLC) module). A corresponding one of these communication circuits may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication circuits may be implemented as a single component (e.g., a single chip), or may be implemented as multi components (e.g., multi chips) separate from each other. The wireless communication circuit 192 may identify and authenticate the electronic device 101 in a communication network, such as the first network 198 or the second network 199, using subscriber information (e.g., international mobile subscriber identity (IMSI)) stored in the subscriber identification module 196.

The wireless communication circuit 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication circuit 192 may support a high-frequency band (e.g., the millimeter wave (mmWave) band) to achieve, e.g., a high data transmission rate. The wireless communication circuit 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication circuit 192 may support various requirements specified in the electronic device 101, an external electronic device (e.g., the electronic device 104), or a network system (e.g., the second network 199). According to an embodiment, the wireless communication circuit 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication circuit 190 (e.g., the wireless communication circuit 192) from the plurality of antennas. The signal or the power may then be transmitted or received between the communication circuit 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
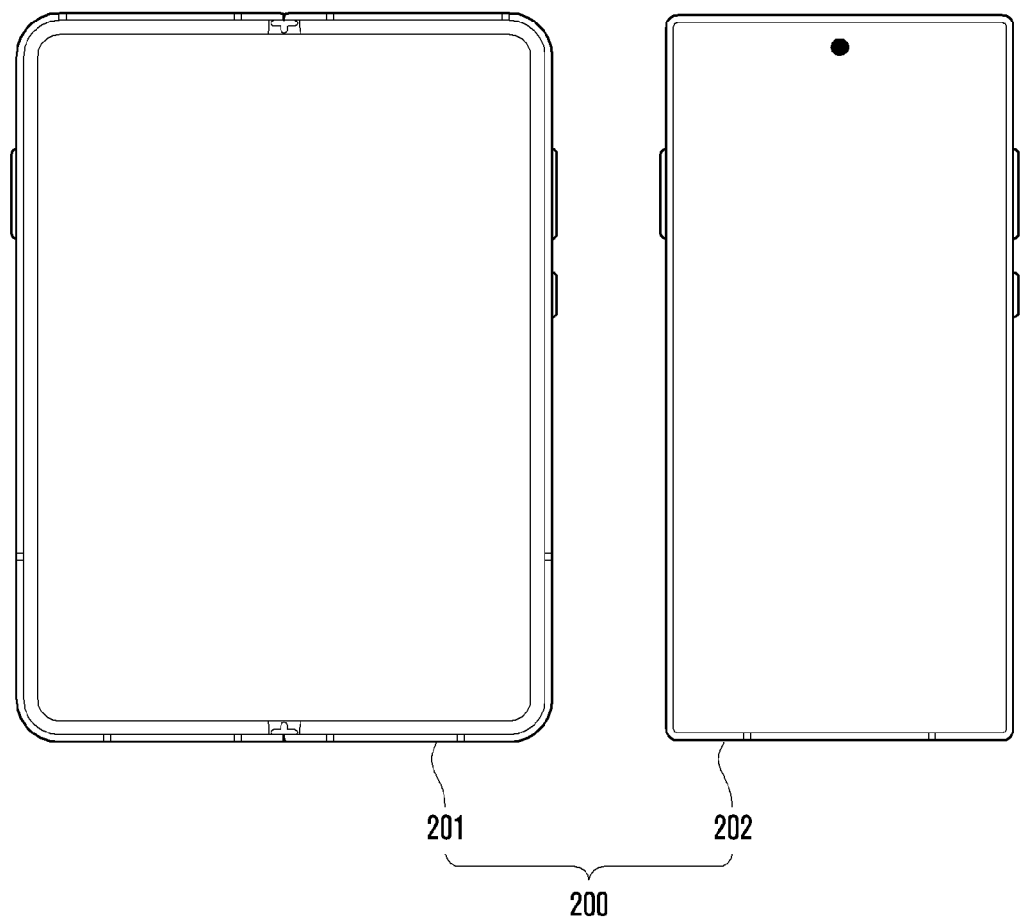
FIGS. 2A and 2B are diagrams illustrating two types of an electronic device and an electronic pen according to various embodiments of the disclosure.
Figure 2B:
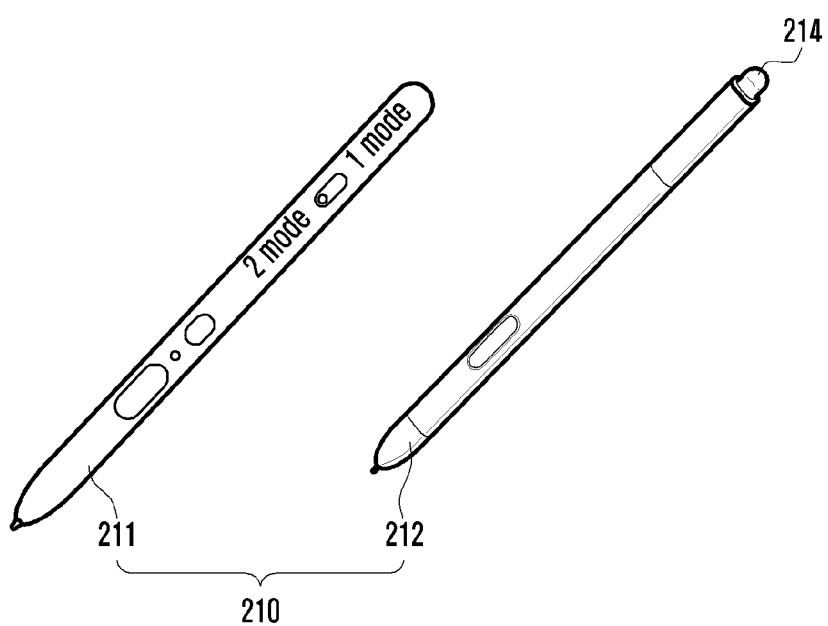

FIGS. 2A and 2B are diagrams illustrating two types of an electronic device and an input device according to various embodiments of the disclosure.

Referring to FIGS. 2A and 2B, an electronic device 200 may include a first electronic device 201 and a second electronic device 202. The first electronic device 201 may include a foldable display (or flexible display). A glass layer of the foldable display may include ultrathin glass (UTG) to be bendable. UTG has superior visibility and hardness compared to a transparent polyimide (PI) film, but may be easily broken or cracked by an external impact. The second electronic device 202 may include a display module capable of receiving a touch input and receive a touch input of an input device 210 (e.g., electronic pen). Hereinafter, it is described that the electronic device 200 includes the first electronic device 201 and the second electronic device 202, but the embodiment of the disclosure is not limited thereto and may further include the electronic device 200 that performs a predetermined operation using various frequencies.

According to various embodiments, the electronic device 200 may receive a frequency from the input device 210 to perform a corresponding function. The first electronic device 201 and the second electronic device 202 may provide different functions for the same frequency. For example, the first electronic device 201 may perform a first function (e.g., pen tip function) upon receiving a first frequency, and block a touch input of the input device 210 upon receiving a second frequency. However, the second electronic device 202 may perform a second function (e.g., eraser function) upon receiving the first frequency and perform a first function (e.g., pen tip function) upon receiving the second frequency.

According to various embodiments, the electronic device 200 may identify an input location of the input device 210 and perform a function corresponding thereto. The electronic device 200 may detect a magnetic field generated in the input device 210 using an electromagnetic resonance (EMR) method. The electronic device 200 may identify a location of the input device 210 based on an induced electromotive force generated by the magnetic field for each channel.

According to various embodiments, the input device 210 may include an EM type resonance circuit. Primary resonance may be induced by transferring energy to the input device 210 in the form of an electric field generated by enabling a current to flow to a sensor panel (e.g., EMR panel, coil) of the electronic device 200. When a current is cut off in the sensor panel of the electronic device 200, a resonance signal induced in the resonance circuit is remained in an attenuated form, and the input device 210 may induce secondary resonance in the sensor panel of the electronic device 200. The electronic device 200 may measure a current (or voltage) induced by the secondary resonance to determine a location of the input device 210.

According to various embodiments, the electronic device 200 may detect a pen event and receive a frequency from the input device 210. According to an embodiment, the pen event may include a touch input and a hover input. The input device 210 may transmit a frequency for performing a predetermined function according to a configuration. For example, the input device 210 may transmit a first frequency (e.g., about 562.5 kHz) for performing a first function (e.g., pen tip function) and a second frequency (e.g., about 593.75 kHz) for performing a second function (e.g., eraser function). The electronic device 200 may receive a frequency from the input device 210 approaching within a reference distance and perform an operation corresponding to the received frequency. For example, the electronic device 200 may perform a first function when receiving a first frequency, and perform a second function when receiving a second frequency. According to another embodiment, the electronic device 200 may perform a second function when receiving a first frequency and perform a first function when receiving the second frequency. Hereinafter, it is described that the input device 210 transmits the first frequency and the second frequency to the electronic device 200 and that the electronic device 200 also receives the first frequency and the second frequency to receive a predetermined function, but a frequency used for the operation of the electronic device 200 and the input device 210 is not limited thereto.

According to various embodiments, the input device 210 may include a first electronic pen 211 and a second electronic pen 212. The first electronic pen 211 may have a soft pen tip and include at least one button, a light emitting diode (LED), and a toggle switch. According to an embodiment, the first electronic pen 211 may be attached or detached using a groove of a housing (not illustrated) of the electronic device 200. The first electronic pen 211 may perform a predetermined function based on a user input to the button. When the first electronic pen 211 receives a touch input to each button, the first electronic pen 211 may determine an operation to be performed, which may be configured when the first electronic pen 211 is manufactured or may be configured directly by a user. For example, the first electronic pen 211 may call an air command based on a user input to the first button. The user may make various gestures while pressing a first button of the first electronic pen 211 to perform a predetermined function. The first electronic pen 211 may determine a function to be performed, transmit a frequency corresponding thereto to the electronic device 200, and the electronic device 200 may receive the frequency to process a corresponding operation. According to an embodiment, the first electronic pen 211 may display at least one color (e.g., red, green, blue) on the LED to display a state of a system. For example, the first electronic pen 211 may display a communication connection state with an external device, a battery, an error, and an update state using at least one color. Information that may be displayed by the first electronic pen 211 using the LED may be configured when the input device 210 is manufactured or may be configured directly by a user when using the first electronic pen 211. In order to perform a predetermined function, the first electronic pen 211 may use at least one frequency. For example, frequencies used by the first electronic pen 211 may include a first frequency to be used when performing a hover and touch function in the electronic device 200, a second frequency to be used when performing a second function in the electronic device 200, and a third frequency to be used when a predetermined function (e.g., air command, pen select) is performed while a button attached to the first electronic pen 211 is pressed.

According to various embodiments, the first electronic pen 211 may change an operating frequency for performing a predetermined function using a switch toggle. The first electronic pen 211 may determine an operation mode thereof to one of a first mode and a second mode based on a location of the switch toggle. In the first mode, the first electronic pen 211 may use a first frequency in order to perform a first function (e.g., pen tip function) and may not support a second function (e.g., eraser function). In the second mode, the first electronic pen 211 may use a first frequency in order to perform a second function (e.g., eraser function) and use a second frequency in order to perform a first function (e.g., pen tip function). According to an embodiment, in the first electronic pen 211, the first mode may be a configuration for using in the first electronic device 201, and the second mode may be a configuration for using in the second electronic device 202. For example, for a selected function (e.g., pen tip function), the first mode of the first electronic pen 211 and the first electronic device 201 may use the same frequency, and the second electronic device 202 may use a different frequency. For example, when the first electronic pen 211 operates in the second mode, the first electronic pen 211 may transmit the second frequency to the electronic device 200 when performing the first function and transmit the first frequency to the electronic device 200 when performing the second function. When the second electronic device 202 receives the first frequency, the second electronic device 202 performs a second function, and when the second electronic device 202 receives the second frequency, the second electronic device 202 performs the first function; thus, there may be configured the same frequency as a frequency in which the first electronic pen 211 uses for operating in the second mode. However, because the first electronic device 201 performs a first function when receiving the first frequency and blocks a touch input when receiving the second frequency, the first electronic device 201 may not perform the user's intended operation. According to an embodiment, an operation mode of the first electronic pen 211 may be changed when the user manipulates the switch toggle, and a message indicating each operation mode may be further displayed at both sides of the switch toggle.

According to various embodiments, the second electronic pen 212 may have a sharp pen tip (e.g., a radius of curvature greater than that of the pen tip of the first electronic pen 211) and include at least one button. The second electronic pen 212 may perform a predetermined function based on a user input to the button. An operation to be performed by the second electronic pen 212 corresponding to a touch input to a button may be configured when the second electronic pen 212 is manufactured or may be determined by a user's configuration. In order to perform a predetermined function, the second electronic pen 212 may use at least one frequency. For example, the second electronic pen 212 may use a second frequency in order to perform a first function and use a first frequency in order to perform a second function.

Figure 3:
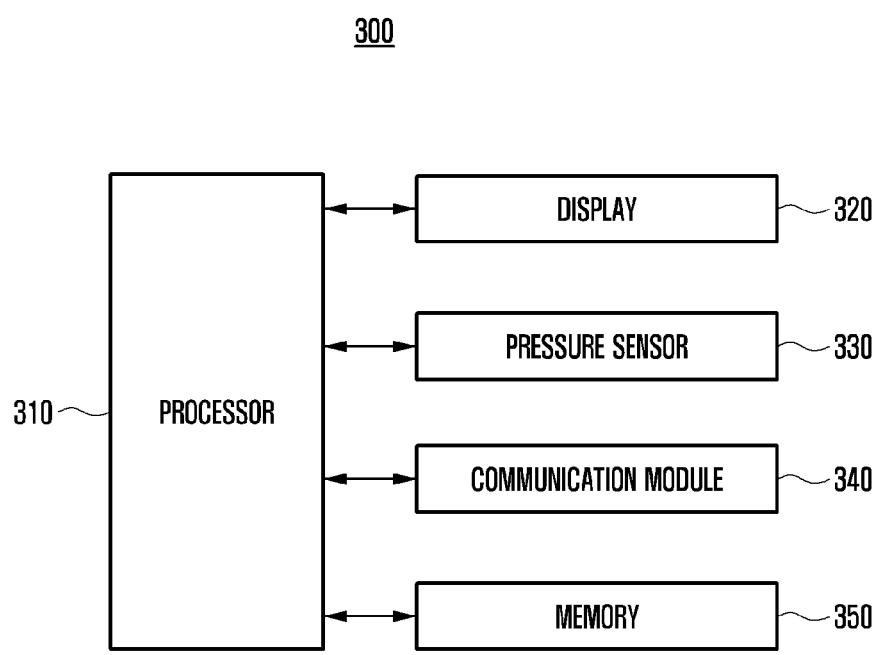
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 (e.g., the electronic device 200 of FIG. 2A) may include a display 320, a pressure sensor 330, a communication circuit 340, a processor 310, and a memory 350, and in various embodiments, some of the illustrated components may be omitted or substituted. The electronic device 300 may further include at least some of the configurations and/or functions of the electronic device 101 of FIG. 1. At least some of the respective components of the illustrated (or not illustrated) electronic device 300 may be operatively, functionally, and/or electrically connected.

According to various embodiments, the display 320 may display various images under the control of the processor 310. The display 320 may be implemented into any one of a liquid crystal display (LCD), a light-emitting diode (LED) display, a micro LED display, a quantum dot (QD) display, or an organic light emitting diode (OLED) display, but it is not limited thereto. The display 320 may be formed in a touch screen for detecting a touch and/or proximity touch (or hovering) input using a part (e.g., finger) of the user's body or an input device (e.g., stylus pen) (e.g., the input device 210 of FIG. 2B). The display 320 may include at least some of the configurations and/or functions of the display module 160 of FIG. 1.

According to various embodiments, at least a part of the display 320 may be flexible, and the display 320 may be implemented into a foldable display or a rollable display.

According to various embodiments, the pressure sensor 330 may receive a pressure applied to the sensor, convert a magnitude of the pressure into an analog electrical signal, and generate an output signal proportional to a supply voltage of the sensor. The pressure sensor 330 may include a pressure transducer and a pressure transmitter. The pressure sensor 330 may include a resonant pressure sensor, a manifold pressure sensor, a strain gage pressure sensor, a capacitive pressure sensor, an unamplified output pressure sensor, an amplified output pressure sensor, and a digital output pressure sensor. The pressure sensor 330 may include at least some of the configurations and/or functions of the sensor module 176 of FIG. 1.

According to various embodiments, the communication circuit 340 may communicate with an external device through a wireless network under the control of the processor 310. The communication circuit 340 may include hardware and software modules for transmitting and receiving data from a cellular network (e.g., long term evolution (LTE) network, 5G network, new radio (NR) network) and a local area network (e.g., Wi-Fi, Bluetooth). The communication circuit 340 may include at least some of the configurations and/or functions of the communication circuit 190 of FIG. 1.

According to various embodiments, the memory 350 may include a volatile memory (e.g., the volatile memory 132 of FIG. 1) and a non-volatile memory (e.g., the non-volatile memory 134 of FIG. 1) to temporarily or permanently store various data. The memory 350 may include at least some of the configurations and/or functions of the memory 130 of FIG. 1 and store the program 140 of FIG. 1.

According to various embodiments, the memory 350 may store various instructions that may be executed by the processor 310. Such instructions may include control commands such as arithmetic and logical operations, data movement, and input/output that may be recognized by the processor 310.

According to various embodiments, the processor 310 may be a configuration to be operatively, functionally, and/or electrically connected to each component (e.g., the display 320, the pressure sensor 330, the communication circuit 340, and the memory 350) of the electronic device 300 (operatively) to perform arithmetic or data processing related to the control and/or communication of each component. The processor 310 may include at least some of the configurations and/or functions of the processor 120 of FIG. 1.

According to various embodiments, arithmetic and data processing functions in which the processor 310 may implement on the electronic device 300 will not be limited, but hereinafter, various embodiments in which the electronic device 300 controls an operating frequency and displays a graphic UI including a warning message to prevent display damage will be described. Operations of the processor 310 to be described later may be performed by loading instructions stored in the memory 350.

According to various embodiments, the processor 310 may detect a pen event and receive a frequency. According to various embodiments, the processor 310 may detect a pen event in which the input device approaches within a predetermined distance from the electronic device 300. For example, when the input device approaches the display 320 of the electronic device 300 for a touch input, the processor 310 may identify a location of the input device using an electromagnetic resonance method and detect a pen event. The processor 310 may receive a frequency from the input device while detecting the pen event. The input device may transmit a frequency so as to perform a determined function according to a user configuration, and the processor 310 may receive the frequency transmitted by the input device. According to an embodiment, the processor 310 may store a touch input of an input device (e.g., the input device 210 of FIG. 2B) and touch information including input coordinates in the memory 350.

According to various embodiments, the electronic device 300 may perform a predetermined function according to the received frequency. The electronic device 300 may perform different functions even for the same frequency according to the type. For example, the first electronic device (e.g., the first electronic device 201 of FIG. 2A) may perform a first function (e.g., pen tip function) upon receiving the first frequency, and block the touch input of the input device upon receiving the second frequency. The second electronic device (e.g., the second electronic device 202 of FIG. 2A) may perform a second function (e.g., eraser function) when receiving the first frequency, and perform a first function (e.g., pen tip function) when receiving the first frequency.

According to various embodiments, the processor 310 may establish a communication connection with the input device using the communication circuit 340. According to various embodiments, the processor 310 may receive at least one of switch information or a device ID from an input device. The information received by the processor 310 from the input device may or may not include switch information. For example, when the input device is a first electronic pen (e.g., the first electronic pen 211 of FIG. 2B), the input device may transmit switch information to the electronic device 300, and when the input device is the second electronic pen (e.g., the second electronic pen 212 of FIG. 2B), the input device may not transmit switch information to the electronic device 300. The switch information may include information on how the switch toggle is configured in the input device, and the device ID may be an intrinsic number of each input device. The processor 310 may determine an operation mode of the input device to one of the first mode or the second mode using the switch information, and determine the input device in which the communication connection is established to one of the first electronic pen or the second electronic pen using the device ID.

For example, when the operation mode of the input device (e.g., the first electronic pen 211 of FIG. 2B) is determined to the first mode, the processor 310 may determine that the input device uses the first frequency in order to perform the first function and does not perform the second function. Conversely, when the operation mode thereof is determined to the second mode, the processor 310 may determine that the input device will use the second frequency in order to perform the first function and use the first frequency in order to perform the second function.

According to various embodiments, in order to prevent damage to the display that may occur when a plurality of touch inputs to the first electronic device are performed with the second electronic pen, the processor 310 may display a warning message at one side of the display 320. According to various embodiments, the processor 310 may display warning messages with different contents based on a type of the electronic device 300, a type of the input device, an operation mode of the input device, and switch information. Hereinafter, when the first electronic device or the second electronic device detects a pen event of the first electronic device or the second electronic device, an operation in which the processor 310 displays a warning message will be described in detail.

According to various embodiments, the processor 310 may identify whether it has been previously communicatively connected with the input device. When the processor 310 establishes a communication connection with the input device and receives information, the processor 310 may store a record thereof in the memory 350. For example, when a communication connection is established with the first electronic pen, the processor 310 may store the first electronic pen and an electronic pen connection record to which information received from the first electronic pen is mapped in the memory 350. Thereafter, when communication with a new input device is connected, the processor 310 may identify whether the currently communicatively connected input device has been previously communicatively connected with reference to the stored connection record.

According to various embodiments, when the first frequency is received in the first electronic device, the processor 310 may perform a first function. For example, when it is determined that the first electronic device performs a pen tip function corresponding to the first frequency, the processor 310 may perform the pen tip function. According to an embodiment, the input device may be a first electronic pen or a second electronic pen. When the first electronic pen is in a first mode, the first frequency may be used for performing the first function and may not support the second function. When the first electronic pen is in a second mode, the first frequency may be used for performing a second function, and the second frequency may be used for performing the first function. Accordingly, a case in which the first electronic device receives the first frequency may include a case in which the first electronic pen performs the first function in the first mode, a case in which the first electronic pen performs the second function in the second mode, and a case in which the second electronic pen performs the second function. In this case, because it is possible to prevent damage to the display, the processor 310 may not display a warning message. For example, in a case in which the first electronic pen performs the first function in the first mode and a case in which the first electronic pen performs the second function in the second mode, a pen event is performed with a soft pen tip of the first electronic pen; thus, it is possible to prevent damage to the display. Further, when the second electronic pen intends to perform a second function, the touch may be made with a blunt eraser part 214 at the rear end of the second electronic pen instead of a sharp pen tip part. When the display 320 of the first electronic device is touched with the corresponding part, the risk of damage to the display 320 is small, so that the first function may be performed without displaying a warning message.

According to various embodiments, when the second frequency is received in the second electronic device, the processor 310 may perform a first function. For example, when it is determined that the second electronic device performs a pen tip function corresponding to the second frequency, the processor 310 may perform the pen tip function. According to an embodiment, the input device may be the second electronic pen or the first electronic pen operating in the second mode. The second electronic pen and the first electronic pen operating in the second mode may use the second frequency in order to perform the first function, and use the first frequency in order to perform the second function. Because the second electronic pen and the second electronic device use the same frequency for the selected operation, when a pen event occurs in the second electronic device with the second electronic pen and the first electronic pen operating in the second mode, the processor 310 may not display a warning message.

According to various embodiments, when the first electronic device receives the second frequency, the processor 310 may display a warning message based on at least one of the received frequency, an electronic pen connection record, an electronic pen type, or an operation mode. A case in which the first electronic device receives the second frequency may include a case in which the first electronic pen intends to perform the first function in the second mode or a case in which the second electronic pen intends to perform the first function.

According to various embodiments, when a pen event in which the second frequency is received occurs, the processor 310 may identify a first electronic pen connection record. If there is no history in which the first electronic pen has been connected, the processor 310 may determine that the currently received second frequency has been transmitted from the second electronic pen and display a graphic UI including a warning message guiding to change to the first electronic pen and to use the first electronic pen. When the user intends to touch the display 320 of the first electronic device with the second electronic pen, there is a risk of damage to the display of the first electronic device; thus, in order to prevent the risk, the processor 310 may guide to use the first electronic pen instead of the second electronic pen.

According to various embodiments, if there is a history in which the first electronic pen has been connected, the processor 310 may identify whether the first electronic pen is currently connected to communication. When the first electronic pen is not currently connected to communication, the processor 310 may determine that the currently received second frequency has been transmitted from the second electronic pen and display a graphic UI including a warning message guiding to change to the first electronic pen and to use the first electronic pen. This is the same as the case in which there is no history in which the above-mentioned first electronic pen has been connected; thus, a description thereof will be omitted.

According to various embodiments, when there is a history in which the first electronic pen has been connected and the electronic device 300 currently establishes a communication connection with the first electronic pen, the processor 310 may identify switch information to determine an operation mode of the first electronic pen. According to various embodiments, when the first electronic pen is operating in the first mode, the first mode of the first electronic pen does not support the second frequency; thus, the processor 310 may determine that a pen event of another input device other than the currently communicatively connected input device is detected. For example, the electronic pen communicatively connected to the electronic device 300 is the first electronic pen and operates in the first mode, but the pen event may occur in the second electronic pen positioned close to the electronic device 300. When a touch input is performed in the first electronic device with the second electronic pen, there is a risk of damage to the display; thus, the processor 310 may display a graphic UI including a warning message guiding to use the first electronic pen. However, when the first electronic pen is operating in the second mode, the processor 310 may determine that the user is using a pen appropriate for the first electronic device, but wrongly configures the switch. For example, when it is the user's intention to perform the first function, but the first electronic pen is currently operating in the second mode, the processor 310 may transmit the second frequency instead of the first frequency to the electronic device 300. In this case, the processor 310 may display a graphic UI including a warning message guiding to change the switch of the first electronic pen currently connected to communication to guide the user to change the switch of the first electronic pen to operate in the first mode. When the user changes the switch of the first electronic pen and the first electronic pen operates in the first mode, the first frequency for performing the first function is transmitted to the first electronic device; thus, the processor 310 may perform a function corresponding to the user's intention.

According to various embodiments, when the second electronic device receives the first frequency, the processor 310 may display a warning message based on at least one of the received frequency, an electronic pen connection record, a type of the input device, or an operation mode. A case in which the second electronic device receives the first frequency may include a case in which the first electronic pen intends to perform the first function in the first mode, a case in which the first electronic pens intends to perform the second function in the second mode, and a case in which the second electronic pen intends to perform a second function.

According to various embodiments, in the second electronic device, when a pen event occurs in which the first frequency is received, the processor 310 may identify the first electronic pen connection record. If there is no record in which the first electronic pen has connected, the processor 310 may determine that the currently received first frequency has been transmitted from the second electronic pen and take no operation. For example, in order to perform the second function, the second electronic pen transmits the first frequency, and when the second electronic device is touched with the second electronic pen, there is no risk of damage to the display; thus, a warning message may not be displayed.

According to various embodiments, if there is a record in which the first electronic pen has been connected, the processor 310 may identify whether the currently communicatively connected input device is the first electronic pen. The processor 310 may determine a case in which the first electronic pen is not currently connected to communication as one of a case in which the first electronic pen performs a first function in the first mode with the currently received first frequency, a case in which the first electronic pen performs a second function in the second mode, or a case in which the second electronic pen performs a second function. Among these, the case in which the second electronic pen performs the second function and the case in which the first electronic pen performs the second function in the second mode are normal operations; thus, a warning message may not be displayed. However, in a case in which the first electronic pen performs the first function in the first mode, the processor 310 may display a graphic UI including a warning message guiding to change the switch. Because the second electronic device performs a second function corresponding to the first frequency, when the user uses the first mode of the first electronic pen, a result different from the user's intention may occur. For example, the user wants to use the first function in the first mode of the first electronic pen, but the second electronic device that has received the first frequency may perform the second function. Accordingly, the processor 310 may change the switch of the first electronic pen to display a warning message guiding to operate in the second mode.

According to an embodiment, the second electronic device has currently received the first frequency, but when the first electronic pen is not connected to communication, the processor 310 may determine not to display again a warning message within a first time (e.g., 3 days). Among cases in which the second electronic device receives the first frequency, a case in which the second electronic pen performs the second function and a case in which the first electronic pen performs the second function in the second mode are normal operations, so that only when the first electronic pen performs the first function in the first mode, if the processor 310 displays a warning message, a malfunction may be avoided. Therefore, in such a situation, because it is not necessary to display the warning message in all cases, the processor 310 may determine not to display again the warning message within a first time after displaying the warning message once.

According to various embodiments, when a first frequency is received in the second electronic device and the first electronic pen is currently communicatively connected, the processor 310 may identify switch information of the first electronic pen. When the first electronic pen is operating in the second mode, in order to perform the second function, the user performs a touch input, and the second electronic device also receives the first frequency to perform the second function, so that the second electronic device may be in a normal operation. In this case, the processor 310 may not take any action. According to another embodiment, when the first electronic pen is operating in the first mode, the processor 310 may display a graphic UI including a warning message guiding to change the switch of the first electronic pen. The first electronic pen may transmit a first frequency for performing a first function in the first mode to the second electronic device. However, because the second electronic device receives the first frequency to perform the second function, the second electronic device may perform a function different from the user's intention. Accordingly, the processor 310 may display a graphic UI including a warning message guiding to change the switch of the first electronic pen. According to an embodiment, the processor 310 may determine to display the warning message only once while a communication connection between the electronic device 300 and the first electronic pen is maintained. When the communication connection between the electronic device 300 and the first electronic pen is disconnected and then reconnected, the processor 310 may determine to display again a warning message.

According to various embodiments, the processor 310 may configure the warning message displayed in a situation in which the first frequency is received in the second electronic device not to display again within a second time (e.g., 1 hour). In the second electronic device, even when a touch input is performed with the second electronic pen having a sharp pen tip, the risk of damage to the display is small; thus, the graphic UI displayed by the processor 310 may include a warning message guiding to change the switch of the first electronic pen. In order not to display the warning message too often, the processor 310 may not display the warning message of the same content within the second time.

According to various embodiments, the processor 310 may obtain a touch pressure applied to the display 320 from the pressure sensor 330. The display of the first electronic device may be damaged by a touch input of the second electronic pen to the first electronic device. In order to prevent this, the processor 310 may measure a touch pressure applied to the electronic device 300.

According to various embodiments, when the touch pressure exceeds a reference pressure (e.g., 300 gf), the processor 310 may display a graphic UI including a warning message. In order to prevent the display from being damaged by the touch pressure of the input device, the processor 310 may display a graphic UI including a warning message guiding the user to reduce the touch pressure.

Figure 4:
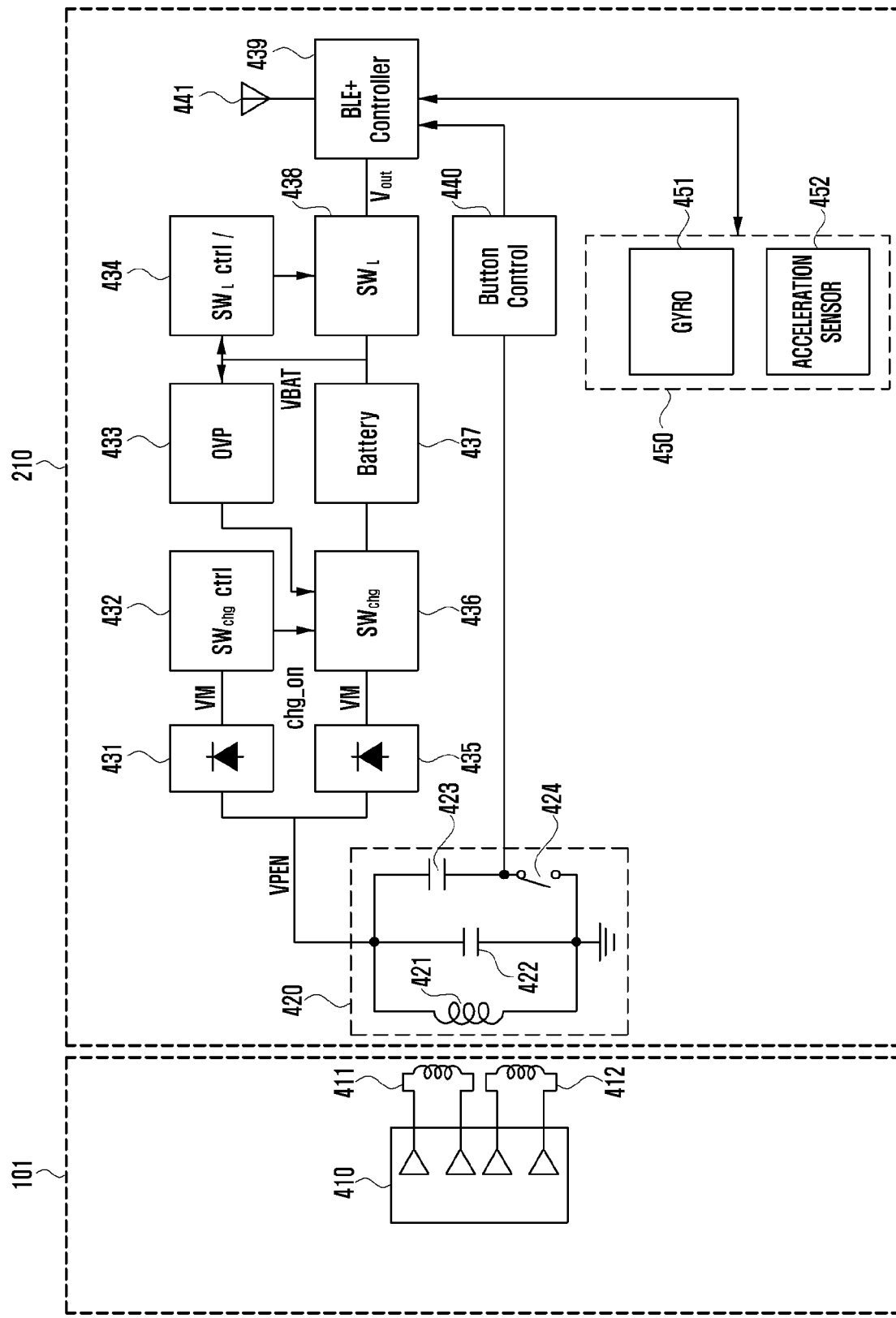
FIG. 4 is a diagram illustrating a configuration of an electronic device and an external electronic device according to an embodiment of the disclosure.

FIG. 4 is a diagram illustrating a configuration of an electronic device and an external electronic device according to an embodiment of the disclosure.

Referring to FIG. 4, according to an embodiment, an electronic device (e.g., the electronic device 101 of FIG. 1, and the electronic device 200 of FIG. 2A) may communicate with an input device (e.g., the input device 210 of FIGS. 2B and 4). The electronic device 101 and the input device 210 may communicate with a communication circuit using at least one of various types of short-range wireless communication methods. For example, the short-range wireless communication method may be Bluetooth low energy (BLE) communication, but it is not limited thereto.

The electronic device 101 may include a pen controller 410 (e.g., the processor 120 of FIG. 1 or the processor 310 of FIG. 3).

The pen controller 410 may include, for example, at least one amplifier (not illustrated) connected to at least one coil 411 and 412. The pen controller 410 may include at least one coil 411 and 412 and provide charging power to the input device 210 through the at least one coil 411 and 412.

According to an embodiment, when the input device 210 is inserted into an internal space of the electronic device 101, the at least one coil 411 and 412 may be disposed at a location physically adjacent to a coil 421 of the input device 210, but there is no limitation on a disposition location thereof. However, insertion into the internal space is an example, and the electronic device 101 may include an area (or space) in which the input device 210 may be mounted (or attached) in addition to the internal space, and in this case, the input device 210 may be detachably attached to the corresponding area (or space). At least some functions of the pen controller 410 may be performed by the processor 120 or the pen controller 410 and the processor 120 may be integrated to perform at least some functions.

For example, the pen controller 410 may include a control circuit (e.g., a control circuit independent from the processor 120), an inverter, and/or an amplifier in addition to the at least one coil 411 and 412.

A resonance circuit 420 of the input device 210 may include a coil 421, at least one capacitor 422 and 423, and/or a switch 424. When the switch 424 is in an off state, the coil 421 and the capacitor 422 may constitute a resonance circuit, and when the switch 424 is in an on state, the coil 421 and the capacitors 422 and 423 may constitute a resonant circuit. Accordingly, the resonance frequency of the resonance circuit 420 may be changed according to the on/off state of the switch 424. For example, the electronic device 101 may identify the on/off state of the switch 424 based on a frequency of a signal from the input device 210. For example, when a button of the input device 210 is pressed/released, the switch 424 may be turned on/off, and the electronic device 101 may identify whether the button of the input device 210 is pressed based on the frequency of the received signal identified through a digitizer.

At least one rectifier 431 and 435 may rectify and output an AC waveform signal VPEN output from the resonance circuit 420. A charge switch controller 432 (i.e., SWchg ctrl) may receive a rectified signal VM output from the rectifier 431. Based on the rectified signal VM, the charge switch controller 432 may identify whether a signal generated in the resonance circuit 420 is a signal for charging or a signal for detecting a location. For example, the charge switch controller 432 may identify whether the signal generated in the resonance circuit 420 is a signal for charging or a signal for location detection based on, for example, a magnitude of a voltage of the rectified signal VM. Alternatively, the charge switch controller 432 may identify whether a signal having a charging initiation pattern is input based on the waveform of a rectified signal VM.

The charge switch controller 432 may turn on or off the charge switch 436. The charge switch controller 432 may control charging of a battery 437.

In an embodiment, the charge switch 436 may transfer charging power received from the rectifier 435 to the battery 437 under the control of the charge switch controller 432.

When the charge switch 436 is in an on state, the battery 437 may be charged using the received rectified signal VIN. An over-voltage protection circuit (OVP) 433 may identify a battery voltage VBAT, and when the battery voltage VBAT exceeds an overvoltage threshold, the OVP 433 may control the charge switch 436 to an off state.

In an embodiment, a load switch controller 434 (i.e., SWL ctrl) may measure a voltage value output from the battery 437.

When it is identified that a battery voltage VBAT exceeds an operating voltage threshold, the load switch controller 434 (i.e., SWL ctrl) may control a load switch 438 (i.e., $SW_L$) to be in an on state. When the load switch 438 is turned on, power from the battery 437 may be transferred to a BLE communication circuit and controller (BLE+controller) 439. The load switch controller 434 may include an under voltage lock out (UVLO) circuit.

In an embodiment, the load switch 438 may supply power required to operate the BLE communication circuit and controller 439 under the control of the load switch controller 434. The load switch 438 may control the connection between the BLE communication circuit and controller 439 and the battery 437.

The BLE communication circuit and controller 439 may operate using the received power. When a distance between the input device 210 and the electronic device 101 is greater than a threshold distance, a button control circuit 440 may transfer information on a button input to the BLE communication circuit and controller 439. The BLE communication circuit and controller 439 may transmit the received button input information to the electronic device 101 through an antenna 441.

A sensor 450 may include a gyro sensor 451 and/or an acceleration sensor 452. Sensing data obtained by the gyro sensor 451 and/or the acceleration sensor 452 may be transferred to the BLE communication circuit and controller 439.

The BLE communication circuit and controller 439 may transmit a communication signal including the received sensing data to the electronic device 101 through the antenna 441. Alternatively, the BLE communication circuit and controller 439 may identify information (e.g., coordinates and/or displacement of the input device 210) related to the identified location of the input device 210 based on the received sensing data. The BLE communication circuit and controller 439 may transmit information related to the identified location of the input device 210 to the electronic device 101 through the antenna 441.

When the input device 210 is withdrawn or detached from the electronic device 101, the BLE communication circuit and controller 439 may activate the acceleration sensor 452. When a button is pressed, the BLE communication circuit and controller 439 may activate the gyro sensor 451. An activation time point is merely an example, and there is no limitation on an activation time point for each sensor. Further, the sensor 450 may further include a geomagnetic sensor. When only the acceleration sensor 452 is activated, the input device 210 may provide acceleration information measured by the acceleration sensor 452 to the electronic device 101, and the electronic device 101 may operate based on the location and acceleration information of the input device 210 identified based on the input device signal.

Figure 5:
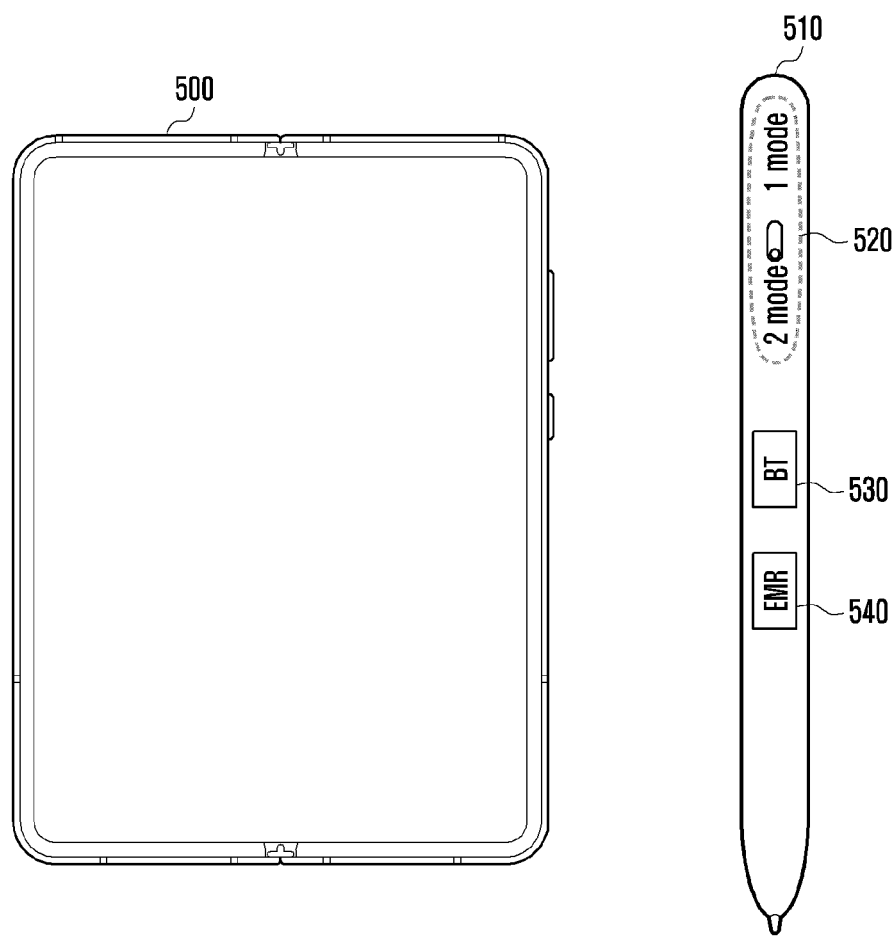
FIG. 5 is a diagram illustrating communication connection between an electronic device and an input device according to an embodiment of the disclosure.

FIG. 5 is a diagram illustrating communication connection between an electronic device and an input device according to an embodiment of the disclosure.

Referring to FIG. 5, a processor (e.g., the processor 310 of FIG. 3) may establish a communication connection with an input device 510 (e.g., the input device 210 of FIGS. 2B and 4) (e.g., stylus). The processor may obtain at least one of switch information or a device ID from the input device. For example, a first electronic pen (e.g., the first electronic pen 211 of FIG. 2B) may generate switch information indicating in which mode it is operating, and a second electronic pen (e.g., the second electronic pen 212 of FIG. 2B) may not generate switch information. Information received by the processor from the first electronic pen may include switch information, and information received from the second electronic pen may not include switch information. The processor may determine an operation mode of the first electronic pen based on the switch information.

According to various embodiments, the processor may detect a pen event using an electromagnetic resonance method and identify a location of the input device 510. According to various embodiments, primary resonance generated in the input device 510 may induce secondary resonance, and the processor may measure a current (or voltage) induced by secondary resonance to determine a location of the input device 510. According to various embodiments, the input device 510 may transmit a frequency to an electronic device 500 (e.g., the electronic device 101 of FIG. 1 and the electronic device 200 of FIG. 2A) together with a pen event. The frequency transmitted from the input device 510 to the electronic device 500 may be determined according to a type of the input device and a function in which the user wants to perform through the input device 510. For example, when the first electronic pen intends to perform a first function (e.g., pen tip function) in the first mode, the first electronic pen may transmit a first frequency (e.g., about 562.5 kHz), and when the second electronic pen intends to perform a first function (e.g., pen tip function), the second electronic pen may transmit a second frequency (e.g., about 593.75 kHz). The input device 510 that has established the communication connection and the input device 510 in which the pen event has occurred may be the same or different. For example, the processor may establish a communication connection with the first input device and detect a pen event by the second input device.

According to various embodiments, the input device 510 may include a switch 520. The first electronic pen may include a switch 520 and change a frequency transmitted to the electronic device 500 according to a configuration of the switch 520. For example, in the first mode, the first electronic pen may transmit a first frequency in order to perform a first function and transmit a second frequency in order to perform a second function. In the second mode, the first electronic pen may transmit the second frequency in order to perform the first function and transmit the first frequency in order to perform the second function. The processor may obtain switch information from the communicatively connected input device 510, and determine an operation mode of the connected input device 510 based on the obtained switch information.

According to various embodiments, the input device 510 may include at least one button. For example, the input device 510 may include a first button 530 and a second button 540. The input device may transmit a third frequency for performing a third function while the button is pressed. For example, the second electronic pen may transmit a third frequency for performing an air command function to the electronic device 500 while the button is pressed. The first button 530 and the second button 540 of the input device 510 may be used for performing different functions, respectively. When the user uses the input device 510 while pressing the first button 530 of the input device 510, the input device 510 may transmit a frequency corresponding to the operation of the first button, and when the user uses the input device 510 while pressing the second button 540, the input device 510 may transmit a frequency corresponding to the second button operation.

Figure 6:
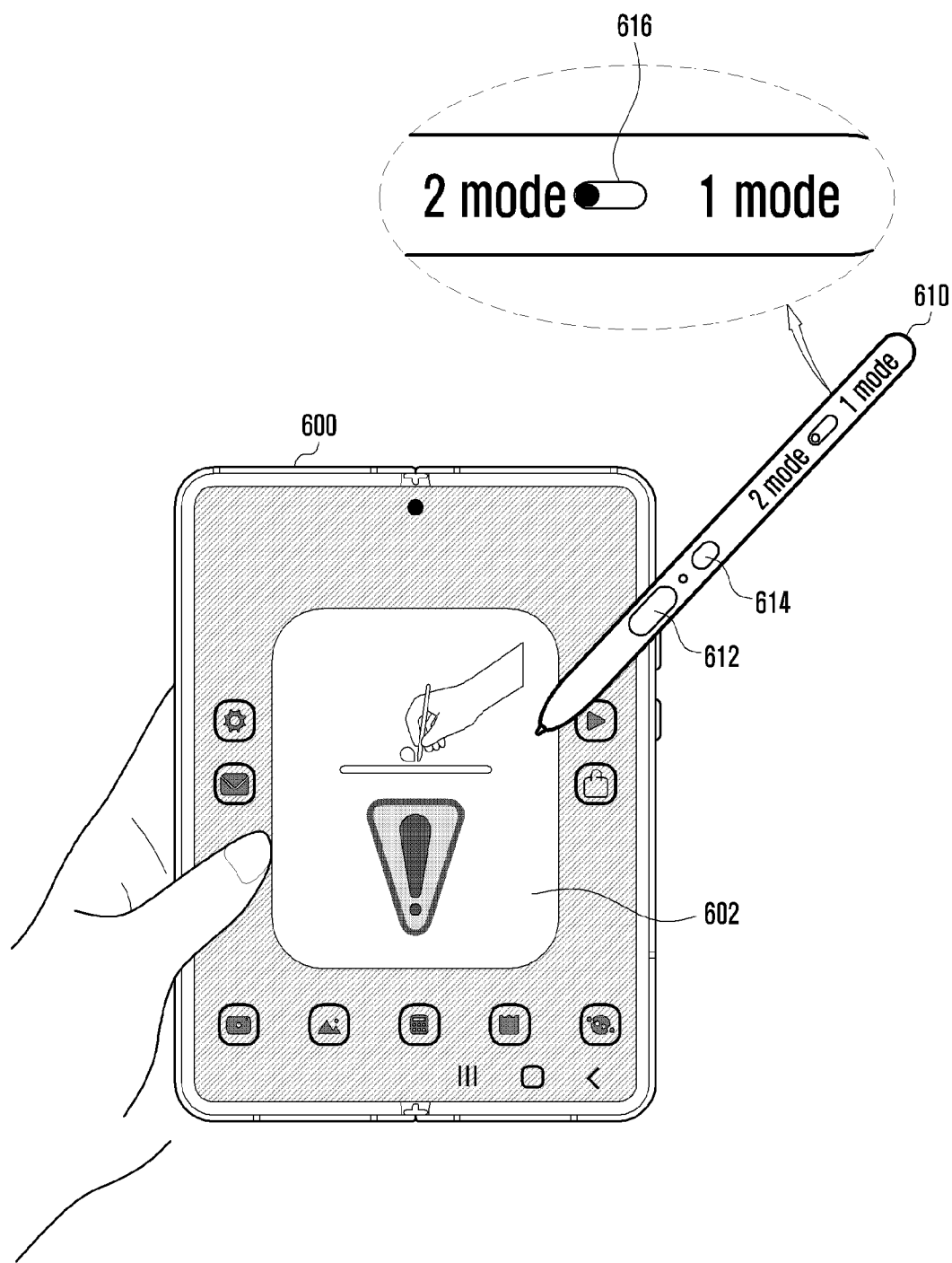
FIG. 6 is a diagram illustrating a display of a graphic user interface (UI) including a warning message in an electronic device according to an embodiment of the disclosure.

FIG. 6 is a diagram illustrating the display of a graphic UI including a warning message in an electronic device according to an embodiment of the disclosure.

Referring to FIG. 6, a processor (e.g., the processor 310 of FIG. 3) may detect a pen event, and display a graphic UI 602 including a warning message on a display (e.g., the display 320 of FIG. 3) based on a type of an electronic device 600 (e.g., the electronic device 101 of FIG. 1, the electronic device 200 of FIG. 2A), a type of an input device 610 (e.g., the input device 210 of FIGS. 2B and 4), and an operation mode of the input device 610. The input device may include a switch 616 (e.g., the switch 520 of FIG. 5) and at least one button. For example, the input device may include a first button 612 and a second button 614.

Referring to FIG. 6, the processor may display a graphic UI 602 including a warning message and a graphic object for guiding to pay attention to a touch input on one area of the display. The processor may display together various warning messages according to circumstances.

According to various embodiments, the processor may display a graphic UI 602 including a warning message and a graphic object for guiding to use the input device 610 appropriate for the electronic device 600. Because the first electronic device (e.g., the first electronic device 201 of FIG. 2A) has a display to be easily damaged, it may be appropriate to use the first electronic pen (e.g., the first electronic pen 211 of FIG. 2B) having a soft pen tip. When a touch input is continued with the second electronic pen (e.g., the second electronic pen 212 of FIG. 2B) having a sharp pen tip, the display of the first electronic device may be damaged. When the processor detects a touch input using the second electronic pen to the first electronic device, the processor may display the graphic UI 602 including a warning message guiding to use the input device 610 appropriate for the electronic device 600.

For example, when the processor of the first electronic device receives a second frequency, the processor may display the graphic UI 602 including a warning message guiding to use the input device 610 appropriate for the electronic device 600. A case in which the first electronic device receives the second frequency may include a case in which the user wants to use a first function in a second mode of the first electronic pen or a case in which the user wants to use a first function in the second electronic pen. In this case, when there is no history of communication connection with the first electronic pen in the first electronic device or when the first electronic pen is not currently connected, the processor may determine that the input device 610 currently transmitting the second frequency is the second electronic pen and display a graphic UI 602 including a warning message guiding to use another type of input device 610.

In another embodiment, when the processor of the first electronic device receives the second frequency, if the first electronic pen is connected to communication and is operating in the first mode, the processor may display a graphic UI 602 including a warning message guiding to use the appropriate input device 610. Because the first mode of the first electronic pen does not use the second frequency, even if the first electronic pen is currently connected to the electronic device 600, the second frequency received by the processor may not be transmitted from the currently connected first electronic pen. Because the second frequency may have been received by performing a touch input with the second electronic pen rather than the first electronic pen connected to communication, the processor may display a graphic UI 602 including a warning message guiding to use the first electronic pen appropriate for the first electronic device.

According to various embodiments, the processor may display the graphic UI 602 including a warning message guiding to change the switch 616 of the input device 610. In a case in which the first electronic pen is communicatively connected to the electronic device 600, only when the first electronic pen is configured in the first mode, the first electronic device may perform an operation desired by the user, and only when the first electronic pen is configured in the second mode, the second electronic device (e.g., the second electronic device 202 of FIG. 2A) may perform an operation desired by the user. When the first electronic pen is configured in the second mode in the first electronic device or when the first electronic pen is configured in the first mode in the second electronic device, the processor may display a graphic UI 602 including a warning message guiding to change the switch 616 of the input device 610 based on the switch information.

For example, when the processor of the first electronic device receives the second frequency, if the first electronic pen is connected and is configured to the second mode, the processor may display a graphic UI 602 including a warning message guiding to change the switch 616. In the second mode, the first electronic pen may transmit a second frequency in order to perform a first function, and transmit a first frequency in order to perform a second function. However, because the first electronic device performs the first function when it receives the first frequency and blocks the touch input when it receives the second frequency, the first electronic device may not be able to perform a function desired by the user. Accordingly, the processor may display the graphic UI 602 including a warning message guiding to change the switch 616 to guide the user to perform a desired operation in the first electronic device.

In another embodiment, when the processor of the second electronic device receives the first frequency, if the first electronic device has a connection history but is not currently connected, the processor may display the graphic UI 602 including a warning message guiding to change the switch 616. A case in which the processor of the second electronic device receives the first frequency may include a case in which the user uses the first function in the first mode of the first electronic pen, a case in which the user uses the second function in the second mode of the first electronic pen, and a case in which the user uses the second function with the second electronic pen. The first mode of the first electronic pen transmits the first frequency when performing the first function and does not support the second function, whereas the second electronic device may perform the second function upon receiving the first frequency and perform the first function upon receiving the second frequency, Accordingly, even if the user performs a touch input so as to use the first function in the first mode of the first electronic pen, the second electronic device may perform the second function. In order to guide the user to perform an intended operation, the processor may display a graphic UI 602 including a warning message guiding to change the operation mode of the first electronic pen to the second mode.

In another embodiment, when the processor of the second electronic device receives a first frequency, if the first electronic device is currently connected and is operating in the first mode, the processor may display a graphic UI 602 including a warning message guiding to change the operation mode. Because this is the same as described in the previous embodiment, a description thereof will be omitted.

Figure 7A:
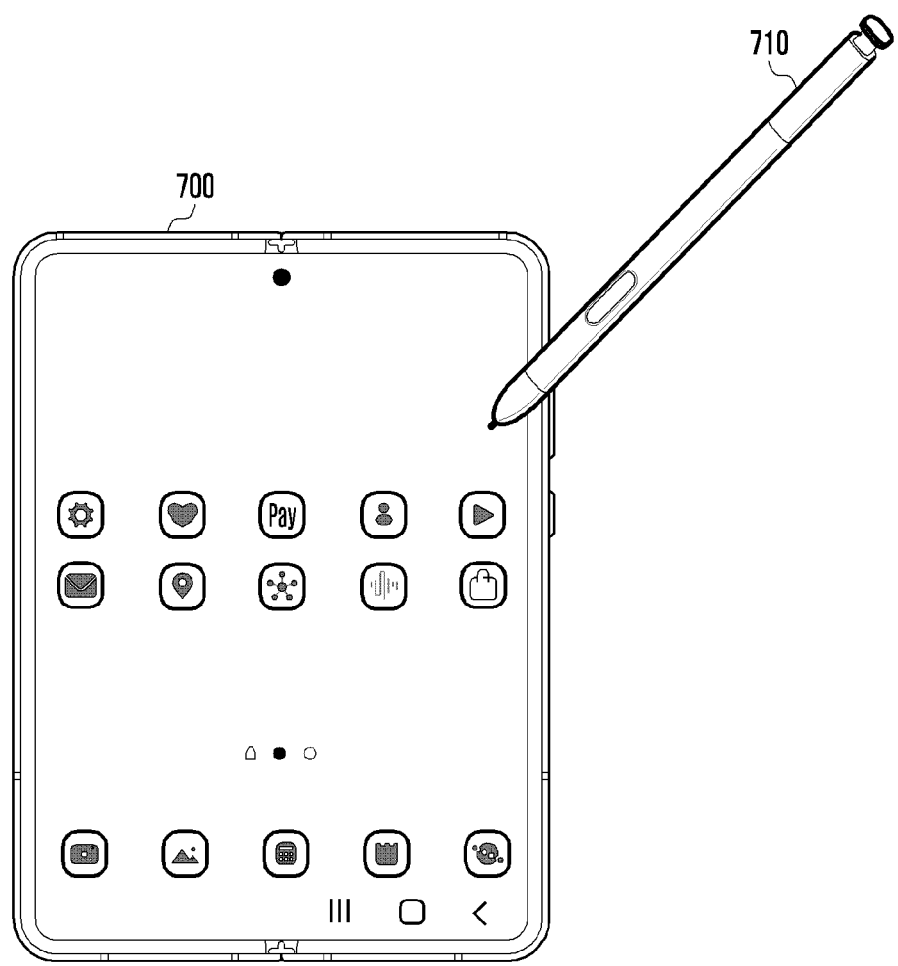
FIGS. 7A and 7B are diagrams illustrating an input to a first electronic device with a second electronic pen according to various embodiments of the disclosure.
Figure 7B:
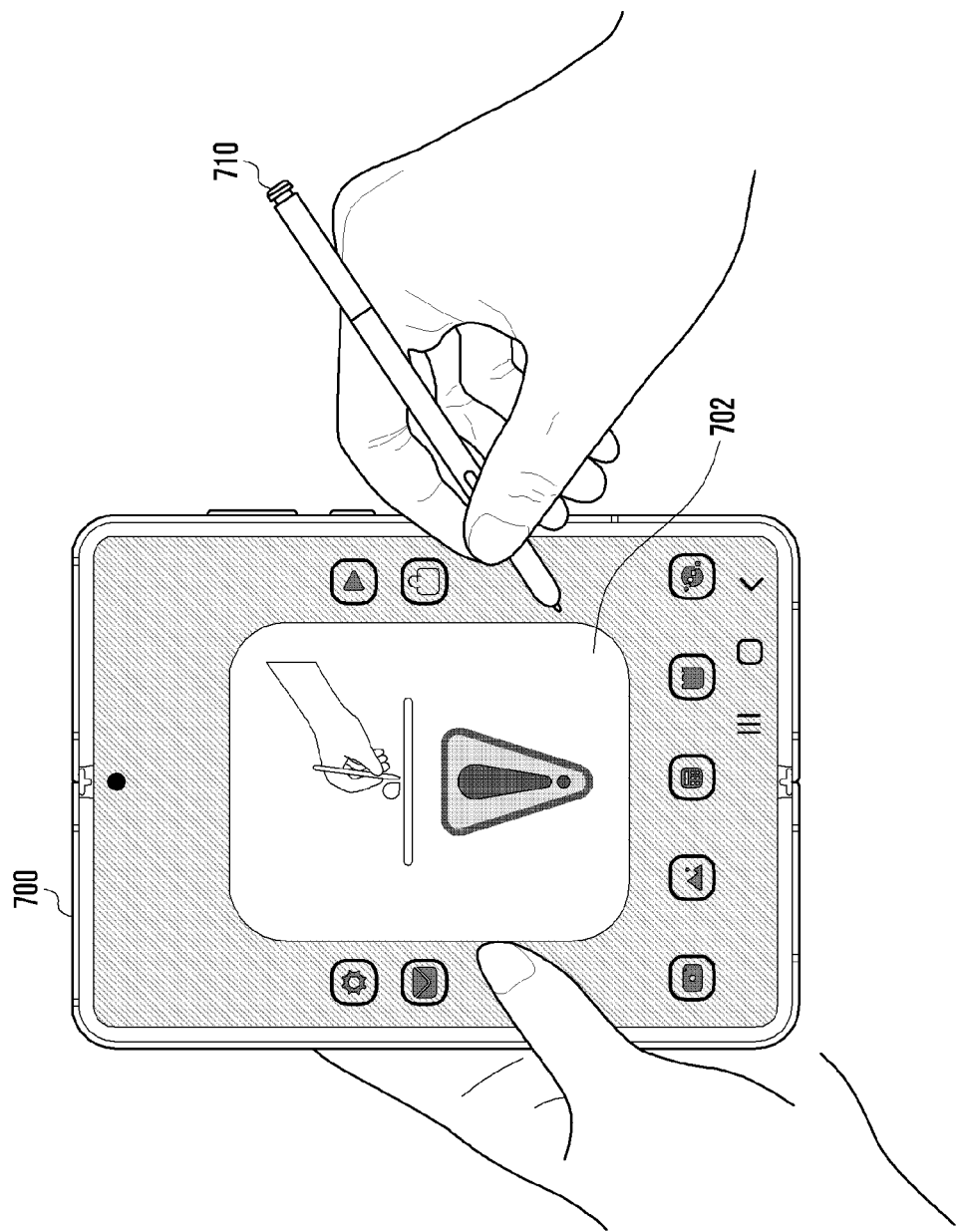

FIGS. 7A and 7B are diagrams illustrating an input to a first electronic device with a second electronic pen according to various embodiments of the disclosure.

Referring to FIG. 7A, a processor (e.g., the processor 310 of FIG. 3) may detect a pen event of a second electronic pen 710 (e.g., the second electronic pen 212 of FIG. 2B) for a first electronic device 700 (e.g., the first electronic device 201 of FIG. 2A). Because the first electronic device 700 may include a foldable display (e.g., the display 320 of FIG. 3), when a touch input is performed with a sharp pen tip of the second electronic pen 710, the display may be damaged.

Referring to FIG. 7B, when a pen event for the first electronic device 700 is detected with the pen tip of the second electronic pen 710, the processor may display a graphic UI 702 including a warning message. In the first electronic device 700, the processor may receive a first frequency to perform a first function, and block a touch input upon receiving the second frequency. The second electronic pen 710 may transmit a second frequency in order to perform a first function and transmit a first frequency in order to perform a second function. Accordingly, when the user uses the second electronic pen 710 in order to perform the first function, the processor may receive the second frequency to block the touch input. When the user uses the second electronic pen 710 in order to perform the second function, the processor may receive the first frequency to perform the first function. Because the user's intention and an operation performed by the processor are different, the processor may induce the user to use a different type of pen. Further, the processor may display the graphic UI 702 including the warning message on the display.

Figure 8A:
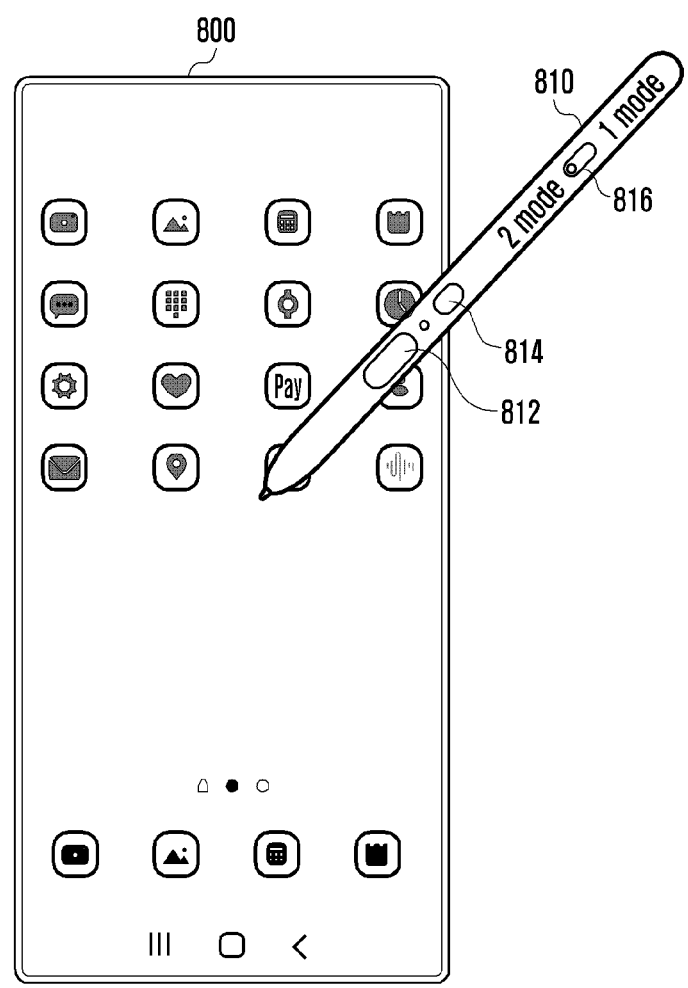
FIGS. 8A and 8B are diagrams illustrating an input to a second electronic device with a first electronic pen according to various embodiments of the disclosure.
Figure 8B:
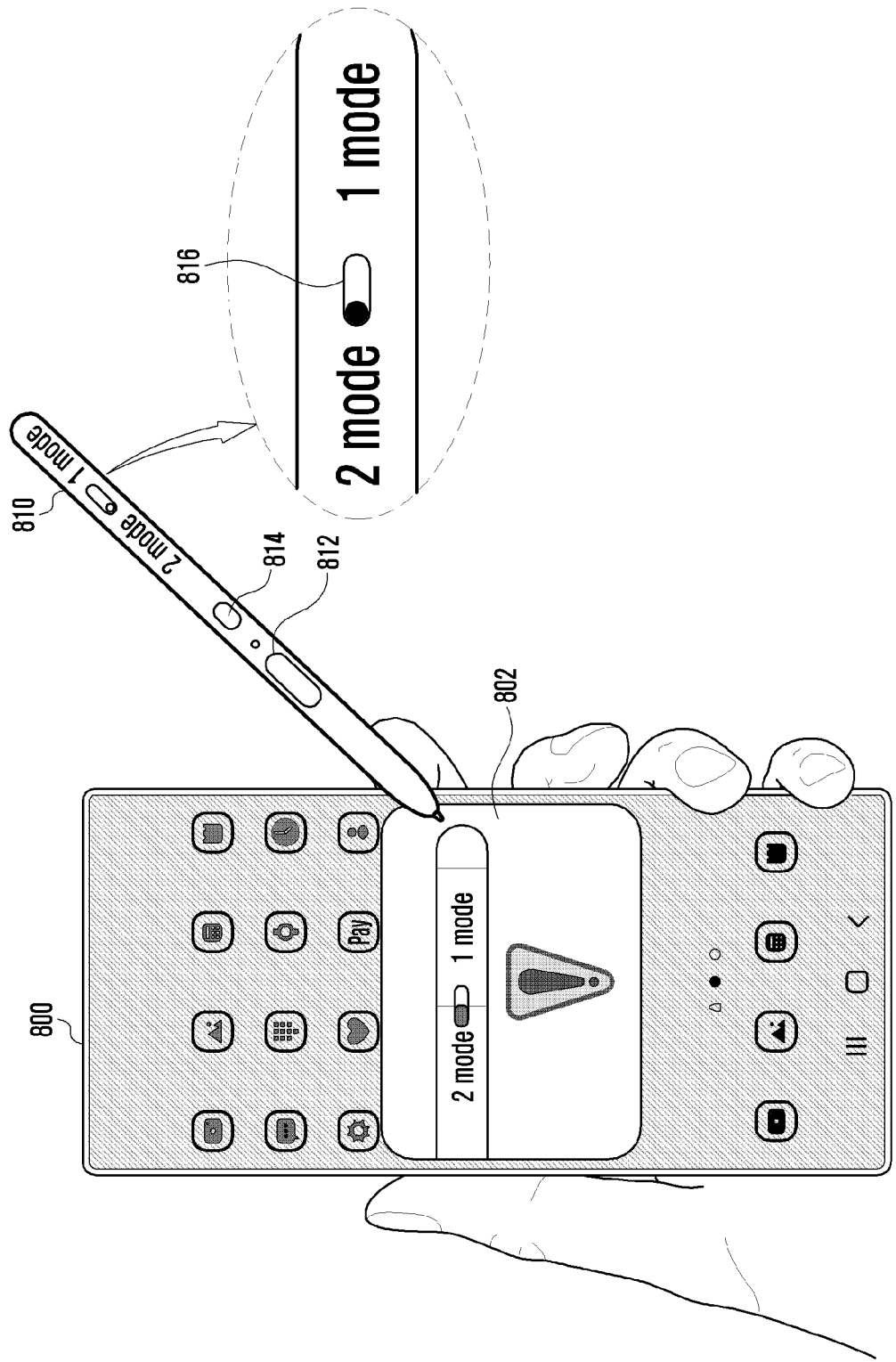

FIGS. 8A and 8B are diagrams illustrating an input to a second electronic device with a first electronic pen according to various embodiments of the disclosure.

Referring to FIG. 8A, a processor (e.g., the processor 310 of FIG. 3) may detect a pen event of a first electronic pen 810 (e.g., a pen event of the first electronic pen 211 of FIG. 2B) for a second electronic device 800 (e.g., the second electronic device 202 of FIG. 2A). In order for the first electronic pen 810 to perform various functions, the processor including a first button 812 and a second button 814 may establish a communication connection with the first electronic pen 810 and obtain switch information and device ID of the first electronic pen 810. The processor may determine an operation mode of the first electronic pen 810 based on the switch information.

Referring to FIG. 8B, when a pen event for the second electronic device 800 is detected with a pen tip of the first electronic pen 810, the processor may display a graphic UI 802 including a warning message. In the second electronic device 800, the processor may receive a first frequency to perform a second function and receive a second frequency to perform a first function. The first electronic pen 810 may transmit a first frequency in order to perform a first function in a first mode and may not support a second function, transmit a second frequency in order to perform a first function in a second mode, and transmit a first frequency in order to perform a second function. Accordingly, when the user transmits the first frequency in the first mode of the first electronic pen 810 in order to perform the first function, the processor may perform the second function. Because the user's intention and an operation performed by the processor are different, the processor may induce the user to change a switch 816 (e.g., the switch 520 of FIG. 5) of the first electronic pen 810. Further, the processor may display a graphic UI 802 including the warning message on the display (e.g., the display 320 of FIG. 3).

According to various embodiments, the processor may not display again the warning message until a predetermined time elapses after displaying the warning message. A case in which the second electronic device 800 receives the first frequency may include a case in which a second electronic pen (e.g., the second electronic pen 212 of FIG. 2B) performs a second function and a case in which the first electronic pen 810 performs a second function in the second mode. In such a case, because an appropriate input device (e.g., the input device 210 of FIGS. 2B and 4) corresponding to the second electronic device 800 is used, even if the graphic UI 802 including the warning message is not displayed, the processor may operate normally. Therefore, the processor may not display the graphic UI 802 including the warning message in all cases in which the first frequency is input, and when the first frequency is input again after a predetermined time elapses, the processor may display a graphic UI 802 including the warning message.

FIGS. 9A and 9B are diagrams illustrating the display of a graphic UI including a warning message according to a pen pressure of an input device in an electronic device according to various embodiments of the disclosure.

Referring to FIG. 9A, a processor (e.g., the processor 310 of FIG. 3) may detect a pen event of an input device 910 (e.g., the input device 210 of FIGS. 2B and 4) for an electronic device 900 (e.g., the electronic device 101 of FIG. 1, the electronic device 200 of FIG. 2A). The pen event may include a touch input to a display (e.g., the display 320 of FIG. 3) and a hover input that moves the input device 910 within a reference distance from the display. The processor may obtain information on a touch input and a hover input of the input device 910 from a sensor module (e.g., the sensor module 176 of FIG. 1).

According to various embodiments, the processor may identify a type of the input device 910 that performs the detected pen event to display a graphic UI 902 including a warning message. The processor may establish a communication connection with the input device 910 to receive a device ID transmitted by the input device 910. For example, the processor may detect a touch input of the second electronic pen (e.g., the second electronic pen 212 of FIG. 2B) for the first electronic device (e.g., the first electronic device 201 of FIG. 2A). The processor may determine that the input device 910 currently performing a touch input is the second electronic pen based on the device ID obtained by establishing a communication connection with the second electronic pen. Because the display of the first electronic device may be damaged when the first electronic device is touched with the second electronic pen, the processor may display a graphic UI 902 including a warning message guiding to change the using pen. For example, the processor may display a graphic UI 902 including a warning message such as "It is recommended to use S Pen Pro. Screen damage may occur when using a normal S Pen."

Referring to FIG. 9B, the processor may display a graphic UI 902 including a warning message based on a touch input of the input device 910. When a pressure applied by the input device 910 to the display of the electronic device 900 exceeds a reference pressure (e.g., 300 gf), the display of the electronic device 900 may be damaged. In order to prevent the display from being damaged, the processor may obtain information on a pressure applied to the display by the input device 910 from a pressure sensor (e.g., the pressure sensor 330 of FIG. 3). The processor may display a graphic UI 902 including a warning message instructing to reduce a touch pressure of the input device 910 to the display based on the obtained pressure information. For example, the processor may display a graphic UI 902 including a warning message such as "Using the pen with a force may cause screen damage."

Figure 10:
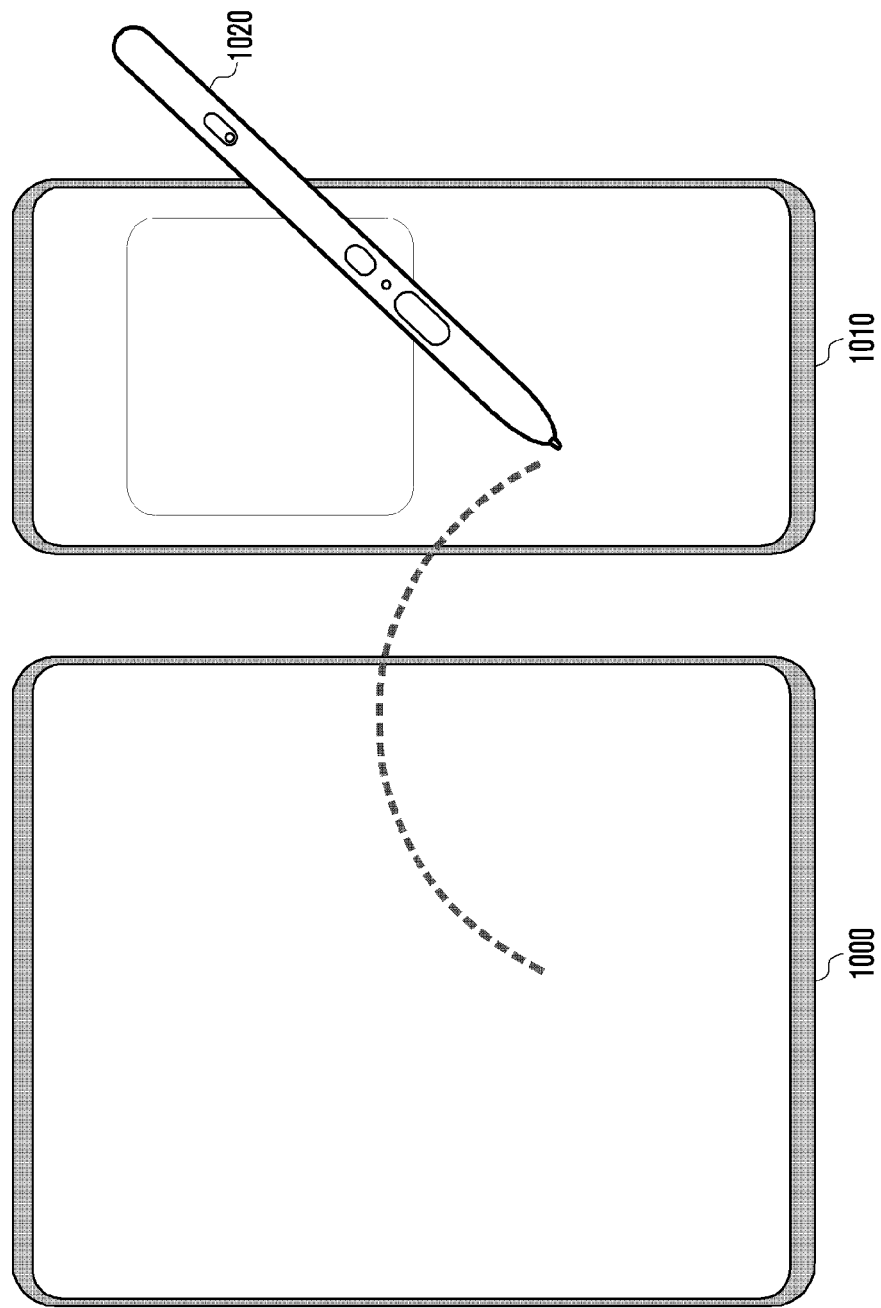
FIG. 10 is a diagram illustrating an input of an input device being performed in a first electronic device and then being performed in a second electronic device according to an embodiment of the disclosure.

FIG. 10 is a diagram illustrating an input of an input device being performed in a first electronic device and then being performed in a second electronic device according to an embodiment of the disclosure.

According to various embodiments, a processor (e.g., the processor 310 of FIG. 3) may display various warning messages according to a received frequency and a type of the electronic device (e.g., the electronic device 101 of FIG. 1 and the electronic device 200 of FIG. 2A).

Referring to FIG. 10, it illustrates that a user performs a pen event in a first electronic device 1000 (e.g., the electronic device 101 of FIG. 1, the electronic device 200 of FIG. 2A) and a second electronic device 1010 (e.g., the electronic device 202 of FIG. 2A). When the user performs a touch input to the first electronic device 1000 (e.g., the first electronic device 201 of FIG. 2A) using a first electronic pen 1020 (e.g., the first electronic pen 211 of FIG. 2A), the first electronic pen 1020 may be configured to the first mode. A first processor of the first electronic device 1000 may receive a first frequency from the first electronic pen 1020 to perform a first function. Thereafter, when the user performs a touch input to the second electronic device 1010 while configuring the first mode with the same input device (e.g., the input device 210 of FIGS. 2B and 4), the second electronic device 1010 transmits a first frequency in order to perform the first function, as in when using in the first electronic device 1000 and does not support the second function; thus, the second function may not be used. However, a second processor of the second electronic device 1010 may receive the first frequency to perform the second function. When the user does not change a switch (e.g., the switch 520 of FIG. 5) of the first electronic pen 1020, but directly uses the first electronic pen 1020 in the second electronic device 1010, the second processor may not accurately perform a function in which the user wants to perform in the second electronic device 1010. The second processor may display a graphic UI including a warning message guiding to change the switch to induce the user to change the switch of the first electronic pen 1020.

An electronic device according to various embodiments may include a display; a communication circuit; a memory; and a processor operatively connected to the display, the communication circuit, and the memory, wherein the processor may be configured to detect a pen event for the display to obtain a frequency; to establish a communication connection with an electronic pen using the communication circuit to obtain at least one of switch information or a device ID; to obtain an electronic pen connection record from the memory; to determine a type of the electronic pen based on the device ID; to determine an operation mode of the electronic pen based on the switch information when the switch information is obtained; and to perform a predetermined function based on at least one of the frequency, the electronic pen connection record, the type of the electronic pen, or the operation mode.

According to various embodiments, the processor may perform a first function when the frequency is a first frequency and block a touch input of the electronic pen when the frequency is a second frequency.

According to various embodiments, when the second frequency is obtained, the processor may identify whether the electronic pen connection is a first connection based on the electronic pen connection record and display a graphic UI including a warning message guiding to use a dedicated pen at one side of the display when the electronic pen connection is a first connection.

According to various embodiments, the processor may determine the electronic pen to one of a first electronic pen or a second electronic pen based on the device ID, and display a graphic UI including a warning message guiding to use a dedicated pen at one side of the display when the electronic pen is the second electronic pen.

According to various embodiments, the processor may determine an operation mode of the electronic pen to one of a first mode of performing a first function at a first frequency and performing a second function at a second frequency or a second mode of performing a second function at the first frequency and performing a first function at the second frequency based on the switch information.

According to various embodiments, when the second frequency has been obtained and the electronic pen is in a first mode, the processor may display a graphic UI including a warning message guiding to use a dedicated pen at one side of the display.

According to various embodiments, when the second frequency has been obtained and the electronic pen is in a second mode, the processor may display a graphic UI including a warning message guiding to change the switch at one side of the display.

According to various embodiments, the processor may perform a second function when the frequency is a first frequency and perform the first function when the frequency is a second frequency.

According to various embodiments, when the first frequency is obtained, the processor may identify whether the electronic pen connection is a first connection based on the electronic pen connection record and display a graphic UI including a warning message at one side of the display based on at least one of a type of the electronic pen or switch information when the electronic pen connection is not a first connection.

According to various embodiments, the processor may not display again the graphic UI until a reference time elapses from a time at which the graphic UI has been recently displayed.

According to various embodiments, the processor may display the graphic UI only once while a communication connection established with the electronic pen is maintained.

According to various embodiments, the electronic device may further include a pressure sensor, wherein the processor may obtain a touch pressure of the electronic pen to the display from the pressure sensor and display a graphic UI including a warning message at one side of the display when the touch pressure exceeds a reference pressure.

According to various embodiments, the processor may receive a touch input of the electronic pen to the display and store touch information including input coordinates of the touch input in the memory.

Figure 11:
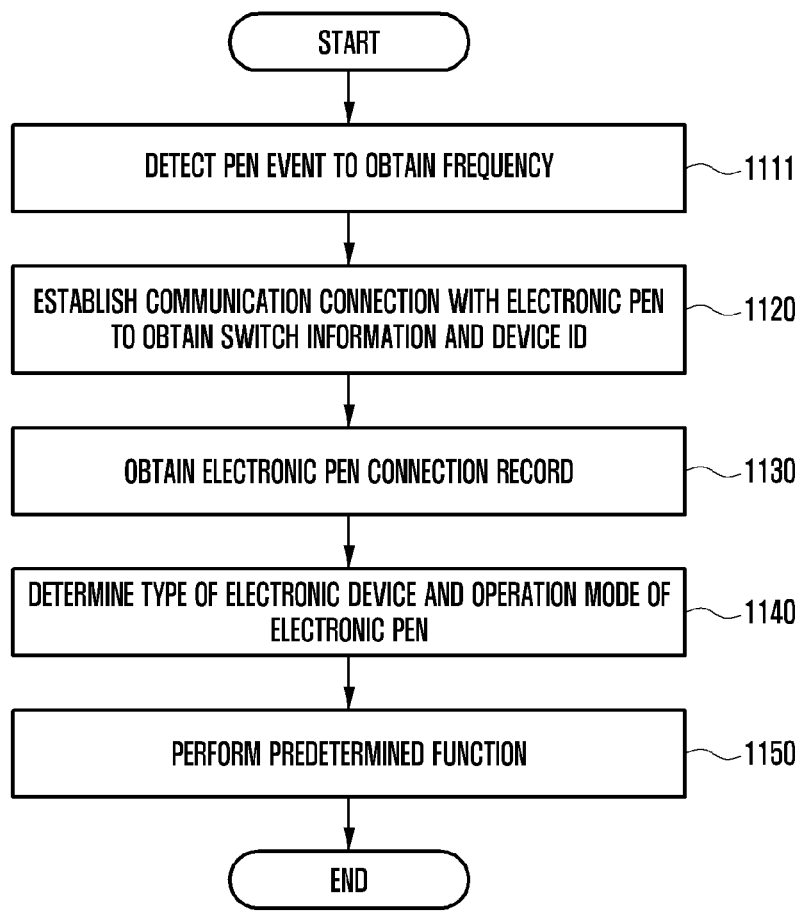
FIG. 11 is a flowchart illustrating a method in which an electronic device operates an input device according to an embodiment of the disclosure.

FIG. 11 is a flowchart illustrating a method in which an electronic device operates an input device according to an embodiment of the disclosure.

Referring to FIG. 11, the method may be performed by the electronic device (e.g., the electronic device 101 of FIG. 1 and the electronic device 200 of FIG. 2A) described with reference to FIGS. 1, 2A, 2B, 3 to 6, 7A, 7B, 8A, 8B, 9A, 9B, and 10, and hereinafter, a description of the technical features described above will be omitted.

According to various embodiments, in operation 1111, the electronic device may detect a pen event to obtain a frequency. According to various embodiments, the electronic device may detect a pen event in which an input device (e.g., the input device 210 of FIGS. 2B and 4) approaches within a predetermined distance from the electronic device. For example, when the input device approaches the display (e.g., the display 320 of FIG. 3) of the electronic device in order to perform a touch input, the electronic device may identify a location of the input device using an electromagnetic resonance method and detect a pen event. The electronic device may receive a frequency from the input device while detecting the pen event. In order to perform a determined function according to a user configuration, the input device may transmit a frequency, and the electronic device may receive the frequency transmitted by the input device. According to an embodiment, the electronic device may store touch information including a touch input and input coordinates of the input device in the memory (e.g., the memory 350 of FIG. 3).

According to various embodiments, the electronic device may perform a predetermined function according to the received frequency. According to the type, the electronic device may perform different functions even in the same frequency. For example, a first electronic device (e.g., the first electronic device 201 of FIG. 2A) may perform a first function upon receiving a first frequency, and block a touch input of the input device upon receiving a second frequency. A second electronic device (e.g., the second electronic device 202 of FIG. 2A) may perform a second function upon receiving the first frequency and perform a first function upon receiving the first frequency.

According to various embodiments, in operation 1120, the electronic device may establish a communication connection with the input device to obtain (e.g., the switch 520 of FIG. 5) information and a device ID. Information received by the electronic device from the input device may or may not include switch information. For example, when the input device is the first electronic pen (e.g., the first electronic pen 211 of FIG. 2B), the input device may transmit switch information to the electronic device, and when the input device is the second electronic pen (e.g., the second electronic pen 212 of FIG. 2B), the input device may not transmit switch information to the electronic device. The switch information may include information on how a switch (e.g., the switch 520 of FIG. 5) is configured in the input device.

According to various embodiments, in operation 1130, the electronic device may obtain an electronic pen connection record from the memory. When the electronic device establishes a communication connection with the input device and receives information, the electronic device may store a record thereof in the memory. Thereafter, when communication is connected with a new input device, the electronic device may identify whether the currently communicatively connected input device has been previously communicated with each other with reference to the stored connection record.

According to various embodiments, in operation 1140, the electronic device may determine a type thereof and an operation mode of the input device. The electronic device may determine the operation mode of the input device to one of the first mode or the second mode using the switch information and determine the input device in which a communication connection is established using the device ID to one of the first electronic pen or the second electronic pen.

According to various embodiments, when a first frequency is received in the first electronic device, the electronic device may perform a first function. According to an embodiment, the input device may be a first electronic pen or a second electronic pen. When the first electronic pen is in a first mode, the first frequency may be used for performing a first function and may not support a second function. When the first electronic pen is in a second mode, the first frequency may be used for performing a second function, and the second frequency may be used for performing the first function. Accordingly, a case in which the first electronic device receives the first frequency may include a case in which the first electronic pen performs a first function in a first mode, a case in which the first electronic pen performs a second function in a second mode, and a case in which the second electronic pen performs a second function. In this case, because the display may be prevented from being damaged, the electronic device may not display a warning message. For example, in a case in which the first electronic pen performs a first function in a first mode and a case in which the first electronic pen performs a second function in a second mode, a pen event may be performed with a soft pen tip of the first electronic pen, thereby preventing the display from being damaged. Further, when the second electronic pen intends to perform the second function, a touch may be made with a blunt eraser part 214 at the rear end of the second electronic pen instead of a sharp pen tip part. When the display of the first electronic device is touched with the corresponding part, the risk of damage to the display is small, so that the first function may be performed without displaying a warning message.

According to various embodiments, when the second frequency is received in the second electronic device, the electronic device may perform a first function. According to an embodiment, the input device may be the second electronic pen or the first electronic pen operating in the second mode. The second electronic pen and the first electronic pen operating in the second mode may use the second frequency in order to perform the first function, and use the first frequency in order to perform the second function. Because the second electronic pen and the second electronic device use the same frequency for the selected operation, when a pen event occurs in the second electronic device with the second electronic pen and the first electronic pen operating in the second mode, the electronic device may not display a warning message.

According to various embodiments, in operation 1150, the electronic device may perform a predetermined function based on the obtained information. According to various embodiments, in order to prevent display damage that may occur when a plurality of touch inputs are performed in the first electronic device with the second electronic pen and to prevent errors due to a wrong switch configuration of the first electronic pen, the electronic device may display a warning message at one side of the display. According to various embodiments, the electronic device may display warning messages with different contents based on a type thereof, a type of the input device, an operation mode of the input device, and switch information.

According to various embodiments, when a second frequency is received in the first electronic device, the electronic device may display a warning message based on at least one of the received frequency, an electronic pen connection record, a type of the input device, or an operation mode. A case in which the first electronic device receives the second frequency may include a case in which the first electronic pen intends to perform a first function in the second mode or a case in which the second electronic pen intends to perform a first function.

According to various embodiments, when the second electronic device receives the first frequency, the electronic device may display a warning message based on at least one of the received frequency, an electronic pen connection record, a type of the input device, or an operation mode. A case in which the second electronic device receives the first frequency may include a case in which the first electronic pen intends to perform a first function in a first mode, a case in which the first electronic pen intends to perform a second function in a second mode, and a case in which the second electronic pen intends to perform a second function.

Figure 12:
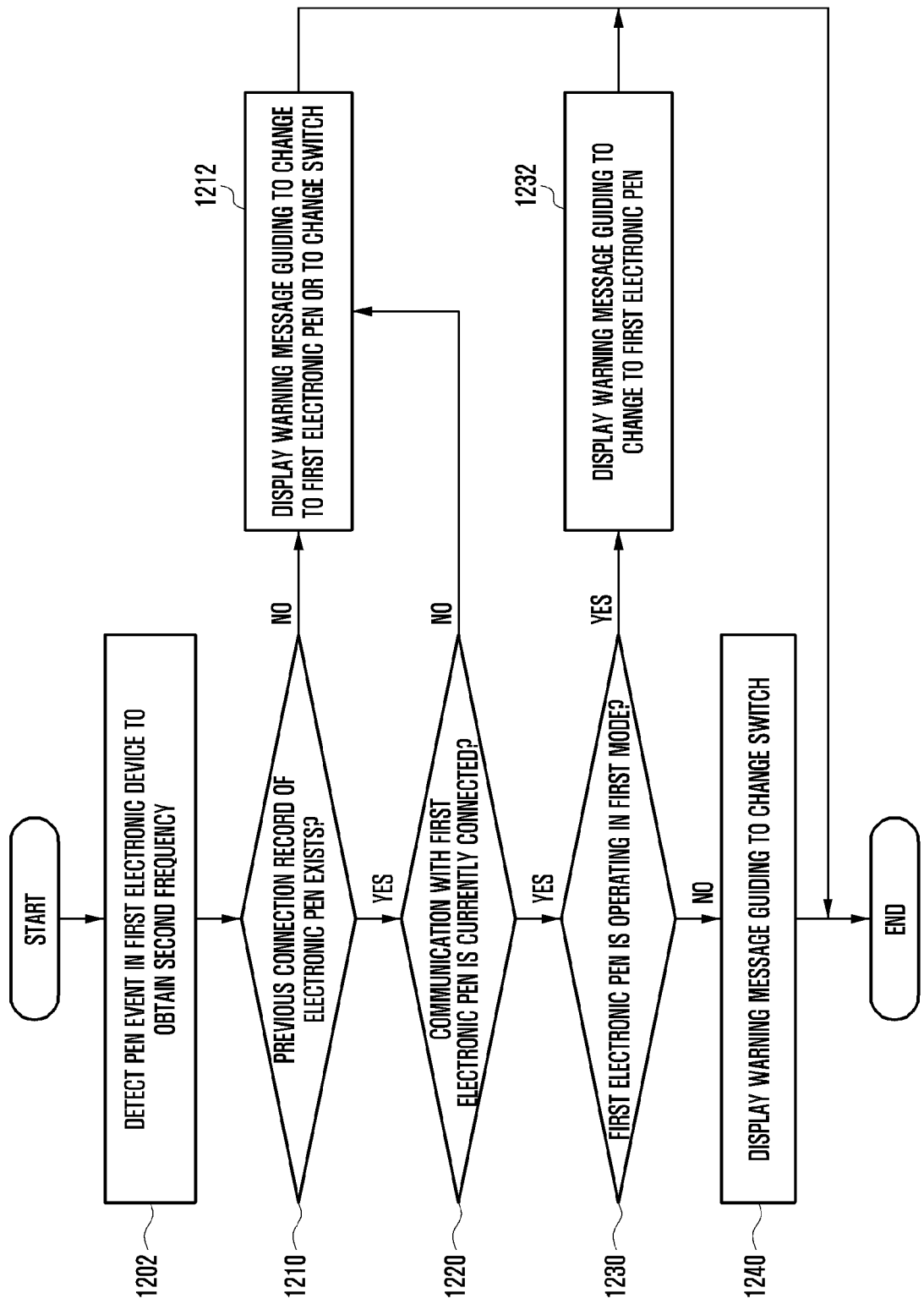
FIG. 12 is a flowchart illustrating a case in which a second frequency is received in a first electronic device according to an embodiment of the disclosure.

FIG. 12 is a flowchart illustrating a case in which a first electronic device receives a second frequency according to an embodiment of the disclosure.

Referring to FIG. 12, according to various embodiments, in operation 1202, the electronic device (e.g., the electronic device 101 of FIG. 1, the electronic device 200 of FIG. 2A) may detect a pen event in the first electronic device (e.g., the first electronic device 201 of FIG. 2A) to obtain a second frequency. A case in which the first electronic device receives the second frequency may include a case in which the first electronic pen (e.g., the first electronic pen 211 of FIG. 2B) intends to perform the first function in the second mode or a case in which the second electronic pen (e.g., the second electronic pen 212 of FIG. 2B) intends to perform the first function.

According to various embodiments, in operation 1210, the electronic device may identify whether a previous connection record of the electronic pen exists. If there is no history in which the first electronic pen has been connected, the electronic device may determine that the currently received second frequency is transmitted from the second electronic pen and display a graphic UI including a warning message guiding to change to the first electronic pen and to use the first electronic pen. When the user intends to touch the display (e.g., the display 320 of FIG. 3) of the first electronic device with the second electronic pen, there is a risk of damage to the display of the first electronic device; thus, in order to prevent this, the electronic device may guide to use the first electronic pen instead of the second electronic pen.

According to various embodiments, in operation 1212, if there is no previous connection record of the first electronic pen, the electronic device may display a graphic UI including a warning message guiding to change to the first electronic pen or to change a switch (e.g., the switch 520 of FIG. 5).

According to various embodiments, in operation 1220, the electronic device may identify whether a communication connection with the first electronic pen is currently established. If the first electronic pen is not currently communicatively connected, the electronic device may determine that a currently received second frequency is transmitted from the second electronic pen and display a graphic UI including a warning message guiding to change to the first electronic pen and to use the first electronic pen.

According to various embodiments, in operation 1230, the electronic device may identify whether the first electronic pen is operating in a first mode. The electronic device may determine whether the first electronic pen is operating in a first mode or a second mode based on the switch information received from the first electronic pen.

According to various embodiments, in operation 1232, the electronic device may display a graphic UI including a warning message guiding to change to the first electronic pen. When the first electronic pen is operating in a first mode, the first mode of the first electronic pen does not support a second frequency, so that the electronic device may determine that a pen event of another input device instead of the currently communicatively connected input device (e.g., the input device 210 of FIGS. 2B and 4) is detected. When a touch input is performed on the first electronic device with the second electronic pen, there is a risk of damage to the display; thus, the electronic device may display a graphic UI including a warning message guiding to use the first electronic pen. However, when the first electronic pen is operating in the second mode, the electronic device may determine that the user is using a pen appropriate for the first electronic device but wrongly configures the switch.

According to various embodiments, in operation 1240, the electronic device may display a graphic UI including a warning message guiding to change the switch. Although it is the user's intention to perform the first function, if the first electronic pen is currently operating in the second mode, the second frequency instead of the first frequency may be transmitted to the electronic device. In this case, the electronic device may display a graphic UI including a warning message guiding to change the switch of the first electronic pen currently connected to communication, and guide the user to change the switch of the first electronic pen to operate in the first mode. When the user changes the switch of the first electronic pen and the first electronic pen operates in the first mode, the first frequency for performing the first function is transmitted to the first electronic device, so that the electronic device can perform a function corresponding to the user's intention.

Figure 13:
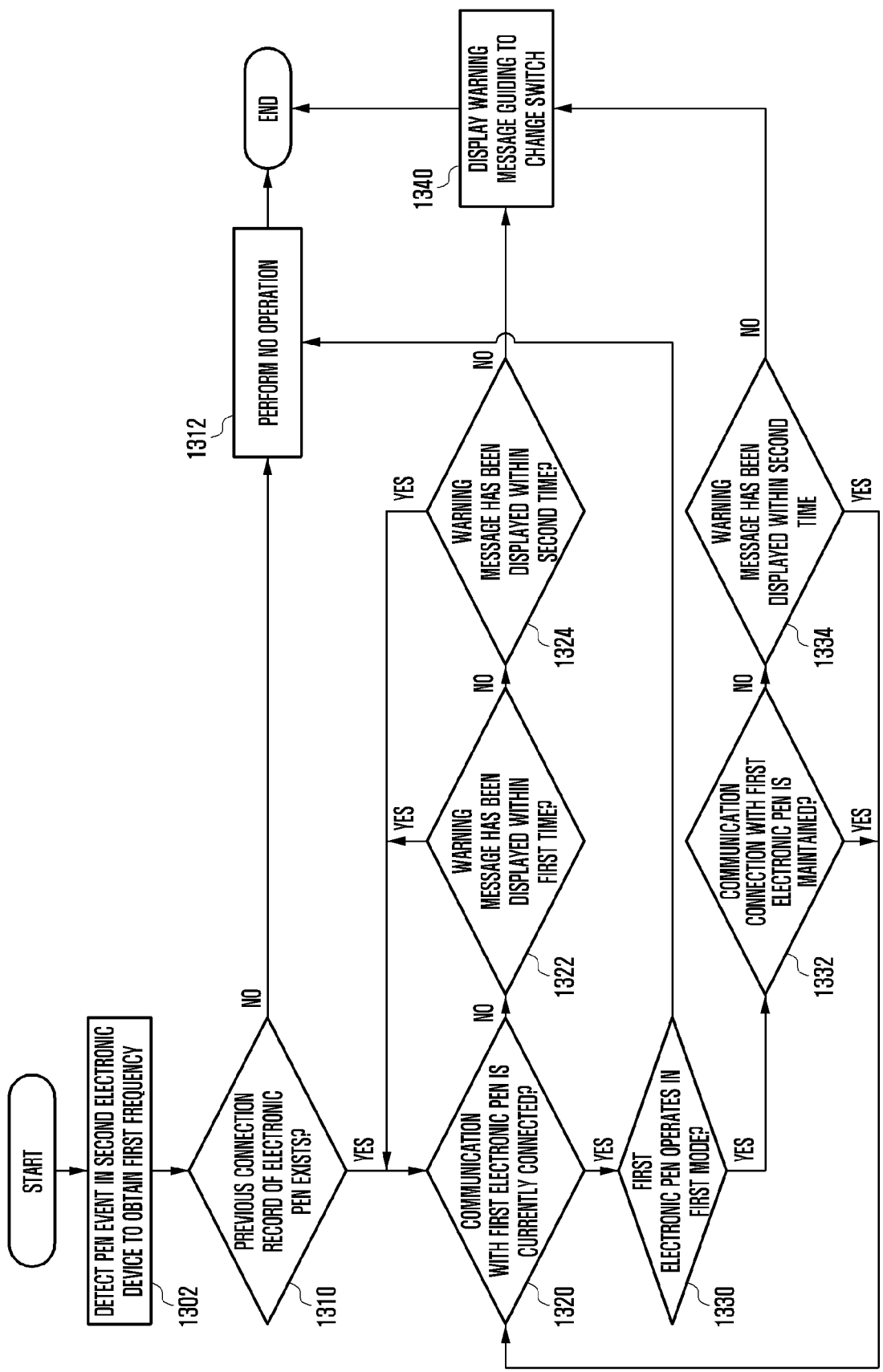
FIG. 13 is a flowchart illustrating a case in which a first frequency is received in a second electronic device according to an embodiment of the disclosure.

FIG. 13 is a flowchart illustrating a case in which a second electronic device receives a first frequency according to an embodiment of the disclosure.

Referring to FIG. 13, according to various embodiments, in operation 1302, the electronic device (e.g., the electronic device 101 of FIG. 1, the electronic device 200 of FIG. 2A) may detect a pen event in a second electronic device (e.g., the second electronic device 202 of FIG. 2A) to obtain a first frequency. A case in which the second electronic device receives a first frequency may include a case in which the first electronic pen (e.g., the first electronic pen 211 of FIG. 2B) intends to perform a first function in a first mode, a case in which the first electronic pen intends to perform a second function in a second mode, and a case in which the second electronic pen (e.g., the second electronic pen 212 of FIG. 2B) intends to perform a second function.

According to various embodiments, in operation 1310, the electronic device may identify whether a previous connection record of the first electronic pen exists. If there is no previous connection record of the first electronic pen, the electronic device may determine that the currently received first frequency is transmitted from the second electronic pen and take no action. For example, in order to perform the second function in the second electronic pen, the second electronic pen transmits the first frequency, and when the second electronic device is touched with the second electronic pen, there is no risk of damage to the display; thus, a warning message may not be displayed.

According to various embodiments, in operation 1312, the electronic device may not perform any operation. According to an embodiment, when there is no previous connection record of the first electronic pen, the electronic device may not perform any operation. According to another embodiment, although the electronic device is currently communicatively connected to the first electronic pen, when the electronic device is operating in the first mode, the electronic device may not perform any operation.

According to various embodiments, in operation 1320, the electronic device may identify whether communication with the first electronic pen is currently connected. The electronic device may determine a case in which the first electronic pen is not currently connected to communication as one of a case in which the first electronic pen performs a first function in a first mode with the currently received first frequency, a case in which the first electronic pen performs a second function in a second mode, or a case in which the second electronic pen performs a second function. Among these, the case where the second electronic pen performs the second function is a normal operation; thus, a warning message may not be displayed. However, when the first electronic pen performs a first function in a first mode thereof with another electronic device, the electronic device may display a graphic UI including a warning message guiding to change a switch (e.g., the switch 520 of FIG. 5) in operation 1340. Because the second electronic device performs a second function corresponding to the first frequency, when the user uses the first mode of the first electronic pen, a result different from the user's intention may occur. For example, the user wants to use the first function in the first mode of the first electronic pen, but the second electronic device that has received the first frequency may perform a second function. Accordingly, the electronic device may change the switch of the first electronic pen to display a warning message guiding to operate in the second mode in operation 1340.

According to various embodiments, in operation 1322, the electronic device may identify whether a warning message has been displayed within a first time. While the second electronic device receives the first frequency, a case in which the second electronic pen performs a second function and a case in which the first electronic pen performs a second function in a second mode are normal operations; thus, only when the first electronic pen performs a first function in a first mode, if the warning message is displayed, a malfunction may be avoided. Therefore, in such a situation, because it is not necessary to display the warning message in all cases, the electronic device may display the warning message once and then determine not to display it again within a first time.

According to various embodiments, in operation 1324, the electronic device may identify whether a warning message has been displayed within a second time. In the second electronic device, even when a touch input is performed with the second electronic pen having a sharp pen tip, the risk of damage to the display is small; thus, the graphic UI displayed by the electronic device may include a warning message guiding to change the switch of the first electronic pen. In order not to display too often the warning message, the electronic device may not display a warning message of the same content within the second time.

According to various embodiments, in operation 1330, the electronic device may identify whether the first electronic pen operates in the first mode. When the first electronic pen is operating in the first mode, the electronic device may display a graphic UI including a warning message guiding to change the switch of the first electronic pen. The first electronic pen may transmit a first frequency for performing a first function in the first mode to the second electronic device. However, because the second electronic device receives the first frequency to perform the second function, the second electronic device may perform a function different from the user's intention. Accordingly, the electronic device may display a graphic UI including a warning message guiding to change the switch of the first electronic pen.

According to various embodiments, in operation 1332, the electronic device may identify whether communication is connected with the first electronic pen. The electronic device may determine to display the warning message only once while the communication connection between the electronic device and the first electronic pen is maintained. When the communication connection between the electronic device and the first electronic pen is disconnected and then reconnected, the electronic device may determine to display the warning message again.

According to various embodiments, in operation 1334, the electronic device may identify whether a warning message has been displayed within the second time. As in operation 1324, in order not to display the warning message too often, the electronic device may not display the warning message of the same content within the second time.

According to various embodiments, in operation 1340, the electronic device may display a warning message guiding to change the switch. If the first electronic pen is not currently communicatively connected, or the first electronic pen is communicatively connected and is operating in the first mode, the operation mode thereof may be wrongly configured; thus, the electronic device may perform a function different from the user's intention. The electronic device may display a warning message guiding to change the switch currently configured to the first mode to the second mode.

According to various embodiments, the electronic device may obtain a touch pressure applied to the display (e.g., the display 320 of FIG. 3) from the pressure sensor (e.g., the pressure sensor 330 of FIG. 3). The display of the first electronic device may be damaged by a touch input of the second electronic pen to the first electronic device (e.g., the first electronic device 201 of FIG. 2A). To prevent this, the electronic device may measure a touch pressure applied thereto.

According to various embodiments, when the touch pressure exceeds a reference pressure (e.g., 300 gf), the electronic device may display a graphic UI including a warning message. In order to prevent the display from being damaged by the touch pressure of the input device (e.g., the input device 210 of FIGS. 2B and 4), the electronic device may display a graphic UI including a warning message guiding the user to reduce the touch pressure.

A method of operating an electronic pen of an electronic device according to various embodiments may include detecting a pen event for a display to obtain a frequency; establishing a communication connection with an electronic pen using a communication circuit to obtain at least one of switch information or a device ID; obtaining an electronic pen connection record from a memory; determining a type of the electronic pen based on the device ID; determining an operation mode of the electronic pen based on the switch information when the switch information is obtained; and performing a predetermined function based on at least one of the frequency, the electronic pen connection record, the type of the electronic pen, or the operation mode.

According to various embodiments, the performing a predetermined function may further include performing a first function when the frequency is a first frequency; and blocking a touch input of the electronic pen when the frequency is a second frequency.

According to various embodiments, the performing a predetermined function may further include determining the electronic pen to one of a first electronic pen or a second electronic pen based on the device ID; and displaying a graphic UI including a warning message guiding to use a dedicated pen at one side of the display when the electronic pen is the second electronic pen.

According to various embodiments, the performing a predetermined function may further include determining an operation mode of the electronic pen to one of a first mode of performing a first function at a first frequency and performing a second function at a second frequency or a second mode of performing a second function at the first frequency and performing a first function at the second frequency based on the switch information.

According to various embodiments, the performing a predetermined function may further include displaying a graphic UI including a warning message guiding to use a dedicated pen at one side of the display when the second frequency has been obtained and the electronic pen is in a first mode.

According to various embodiments, the performing a predetermined function may further include performing a second function when the frequency is a first frequency; and performing a first function when the frequency is a second frequency.

According to various embodiments, the performing a predetermined function may further include, when the first frequency is obtained, identifying whether the electronic pen connection is a first connection based on the electronic pen connection record; and displaying a graphic UI including a warning message at one side of the display based on at least one of a type of an electronic pen or switch information when the electronic pen connection is not a first connection.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
a display;
a communication circuit;
memory; and
one or more processors operatively connected to the display, the communication circuit, and the memory,
wherein the memory store one or more computer programs including computer-executable instructions that, when executed by the one or more processors, cause the electronic device to:
identify, when an electronic pen touches or comes in proximity to the display, a frequency of the electronic pen,
establish a communication connection with the electronic pen using the communication circuit to obtain switch information and a device identification (ID), the switch information comprising information on an operation mode of the electronic pen based on switch configuration information of the electronic pen,
obtain an electronic pen connection record from the memory,
determine a type of the electronic pen based on the device ID,
determine an operation mode of the electronic pen based on the switch information, and
perform a predetermined function based on at least one of the frequency, the electronic pen connection record, the type of the electronic pen, or the operation mode.

2. The electronic device of claim 1, wherein the one or more computer programs further comprise computer-executable instructions to:
perform a first function when the frequency is a first frequency, and
block a touch input of the electronic pen when the frequency is a second frequency.

3. The electronic device of claim 2, wherein the one or more computer programs further comprise computer-executable instructions to:
when the second frequency is obtained,
identify whether the electronic pen connection is a first connection based on the electronic pen connection record, and
display a graphic user interface (GUI) comprising a warning message guiding to use a dedicated pen at one side of the display when the electronic pen connection is the first connection.

4. The electronic device of claim 2, wherein one or more computer programs further comprise computer-executable instructions to:
determine the electronic pen to one of a first electronic pen or a second electronic pen based on the device ID, and
display a graphic user interface (GUI) comprising a warning message guiding to use a dedicated pen at one side of the display when the electronic pen is the second electronic pen.

5. The electronic device of claim 2, wherein the one or more computer programs further comprise computer-executable instructions to:
determine the operation mode of the electronic pen to one of a first mode of performing the first function at the first frequency,
perform a second function at the second frequency or a second mode of performing the second function at the first frequency, and
perform the first function at the second frequency based on the switch information.

6. The electronic device of claim 5, wherein the one or more computer programs further comprise computer-executable instructions to display a graphic user interface (GUI) comprising a warning message guiding to use a dedicated pen at one side of the display when the second frequency has been obtained and the electronic pen is in the first mode.

7. The electronic device of claim 5, wherein the one or more computer programs further comprise computer-executable instructions to display a graphic user interface (GUI) comprising a warning message guiding to change a switch at one side of the display when the second frequency has been obtained and the electronic pen is in a second mode.

8. The electronic device of claim 1, wherein the one or more computer programs further comprise computer-executable instructions to:
perform a second function when the frequency is a first frequency; and
perform a first function when the frequency is a second frequency.

9. The electronic device of claim 8, wherein the one or more computer programs further comprise computer-executable instructions to:
when the first frequency is obtained,
identify whether the electronic pen connection is a first connection based on the electronic pen connection record, and
display a graphic user interface (GUI) comprising a warning message at one side of the display based on at least one of the type of the electronic pen or switch information when the electronic pen connection is not the first connection.

10. The electronic device of claim 9, wherein the one or more computer programs further comprise computer-executable instructions not to display again the graphic GUI until a reference time elapses from a time at which the graphic GUI has been recently displayed.

11. The electronic device of claim 9, wherein the one or more computer programs further comprise computer-executable instructions to display the graphic GUI only once while the communication connection established with the electronic pen is maintained.

12. The electronic device of claim 1, further comprising:
a pressure sensor,
wherein the one or more computer programs further comprise computer-executable instructions to:
obtain a touch pressure of the electronic pen to the display from the pressure sensor, and
display a graphic user interface GUI comprising a warning message at one side of the display when the touch pressure exceeds a reference pressure.

13. The electronic device of claim 1, wherein the one or more computer programs further comprise computer-executable instructions to:
receive a touch input of the electronic pen to the display, and
store touch information comprising input coordinates of the touch input in the memory.

14. A method at an electronic pen of an electronic device, the method comprising:
identifying, by the electronic device, when the electronic pen touches or comes in proximity to a display, a frequency of the electronic pen;
establishing, by the electronic device, a communication connection with the electronic pen using a communication circuit to obtain switch information and a device identification (ID), the switch information comprising the switch information comprising information on an operation mode of the electronic pen based on switch configuration information of the electronic pen;
obtaining, by the electronic device, an electronic pen connection record from a memory;
determining, by the electronic device, a type of the electronic pen based on the device ID;
determining, by the electronic device, an operation mode of the electronic pen based on the switch information when the switch information is obtained; and
performing, by the electronic device, a predetermined function based on at least one of the frequency, the electronic pen connection record, the type of the electronic pen, or the operation mode.

15. The method of claim 14, wherein the performing of the predetermined function further comprises:
performing a first function when the frequency is a first frequency; and
blocking a touch input of the electronic pen when the frequency is a second frequency.

16. The method of claim 15, wherein the performing of the predetermined function further comprises:
determining the electronic pen to one of a first electronic pen and a second electronic pen based on the device ID; and
displaying a graphic user interface (GUI) comprising a warning message guiding to use a dedicated pen at one side of the display when the electronic pen is the second electronic pen.

17. The method of claim 15, wherein the performing of the predetermined function further comprises:
determining the operation mode of the electronic pen to one of a first mode of performing the first function at the first frequency;
performing a second function at a second frequency or a second mode of performing the second function at the first frequency; and
performing the first function at the second frequency based on the switch information.

18. The method of claim 17, wherein the performing of the predetermined function further comprises displaying a graphic user interface (GUI) comprising a warning message guiding to use a dedicated pen at one side of the display when the second frequency has been obtained and the electronic pen is in the first mode.

19. The method of claim 14, wherein the performing of the predetermined function further comprises:
performing a second function when the frequency is a first frequency; and
performing a first function when the frequency is a second frequency.

20. The method of claim 19, wherein the performing of the predetermined function further comprises:
when the first frequency is obtained,
identifying whether the electronic pen connection is a first connection based on the electronic pen connection record; and
displaying a graphic user interface (GUI) comprising a warning message at one side of the display based on at least one of the type of the electronic pen or switch information when the electronic pen connection is not the first connection.

* * * * *